United States Patent
Yi et al.

(10) Patent No.: US 9,504,037 B2
(45) Date of Patent: Nov. 22, 2016

(54) METHOD AND APPARATUS FOR TRANSMITTING AND RECEIVING DATA

(71) Applicant: LG ELECTRONICS INC., Seoul (KR)

(72) Inventors: Yunjung Yi, Seoul (KR); Suckchel Yang, Seoul (KR); Joonkui Ahn, Seoul (KR); Dongyoun Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 18 days.

(21) Appl. No.: 14/417,723

(22) PCT Filed: Aug. 1, 2013

(86) PCT No.: PCT/KR2013/006925
§ 371 (c)(1),
(2) Date: Jan. 27, 2015

(87) PCT Pub. No.: WO2014/021649
PCT Pub. Date: Feb. 6, 2014

(65) Prior Publication Data
US 2015/0257150 A1    Sep. 10, 2015

Related U.S. Application Data

(60) Provisional application No. 61/678,122, filed on Aug. 1, 2012.

(51) Int. Cl.
| | |
|---|---|
| H04W 4/00 | (2009.01) |
| H04W 72/04 | (2009.01) |
| H04B 7/26 | (2006.01) |

(Continued)

(52) U.S. Cl.
CPC ........... *H04W 72/0453* (2013.01); *H04B 7/26* (2013.01); *H04J 11/00* (2013.01); *H04L 1/18* (2013.01); *H04L 5/00* (2013.01); *H04L 5/001* (2013.01); *H04L 5/0016* (2013.01); *H04L 5/0055* (2013.01); *H04W 72/04* (2013.01); *H04W 72/0406* (2013.01); *H04L 5/0023* (2013.01); *H04L 5/0048* (2013.01); *H04L 5/1469* (2013.01); *H04W 84/042* (2013.01)

(58) Field of Classification Search
USPC .................. 370/329, 330, 331, 333, 338
See application file for complete search history.

(56) References Cited

U.S. PATENT DOCUMENTS

| | | | |
|---|---|---|---|
| 2012/0113876 A1* | 5/2012 | Li | H04L 1/1861 370/280 |
| 2012/0213129 A1* | 8/2012 | Jang | H04L 5/001 370/280 |

FOREIGN PATENT DOCUMENTS

| | | |
|---|---|---|
| WO | 2011/132993 | 10/2011 |
| WO | 2012/091490 | 7/2012 |

OTHER PUBLICATIONS

ZTE, "Scheduling and HARQ timing for cross-carrier PUSCH scheduling for TDD CA with different UL-DL configurations," GPP TSG RAN WG1 Meeting #69, R1-122111, May 2012, 9 pages.

(Continued)

*Primary Examiner* — Zewdu A Beyen
(74) *Attorney, Agent, or Firm* — Lee, Hong, Degerman, Kang & Waimey

(57) ABSTRACT

The present invention relates to a method and apparatus for transmitting and receiving data. The method can include the steps of: a terminal transmitting, to a primary cell (P-cell), a first ACK/NACK for downlink transmission of the P-cell through a first uplink ACK/NACK channel; and transmitting, to a secondary cell (S-cell), a second ACK/NACK for downlink transmission of a first S-cell through a second uplink ACK/NACK channel.

14 Claims, 23 Drawing Sheets

(51) Int. Cl.
   *H04J 11/00* (2006.01)
   *H04L 1/18* (2006.01)
   *H04L 5/00* (2006.01)
   *H04L 5/14* (2006.01)
   *H04W 84/04* (2009.01)

(56) References Cited

OTHER PUBLICATIONS

Research in Motion, UK Limited, "HARQ-ACK Transmission for cross-carrier scheduling in Inter-band CA with different UL/DL Configurations," 3GPP TSG RAN WG1 Meeting #69, R1-122726, May 2012, 5 pages.

NTT DOCOMO, "PDSCH HARQ Timing of SCell and PUCCH Collision for Cross-Carrier Scheduling," 3GPP TSG RAN WG1 Meeting #69, R1-121972, May 2012, 5 pages.

PCT International Application No. PCT/KR2013/006925, Written Opinion of the International Searching Authority dated Nov. 22, 2013, 1 page.

* cited by examiner

METHOD AND APPARATUS FOR TRANSMITTING AND RECEIVING DATA

CROSS-REFERENCE TO RELATED APPLICATIONS

This application is the National Stage filing under 35 U.S.C. 371 of International Application No. PCT/KR2013/006925, filed on Aug. 1, 2013, which claims the benefit of U.S. Provisional Application Ser. No. 61/678,122, filed on Aug. 1, 2012, the contents of which are hereby incorporated by reference herein in their entirety.

BACKGROUND OF THE INVENTION

1. Field of the Invention

The present invention relates to wireless communication, and more specifically, to a method and apparatus for transmitting and receiving data.

2. Related Art

Long term evolution (LTE) is a key next generation mobile communication standard based on 3rd Generation Partnership Project (3GPP) Technical Specification (TS) Release 8.

As described in 3GPP TS 36.211 V8.7.0 (2009-05) "Evolved Universal Terrestrial Radio Access (E-UTRA); Physical Channels and Modulation (Release 8)", LTE physical channels may be divided into downlink channels (Physical Downlink Shared Channel (PDSCH) and Physical Downlink Control Channel (PDCCH)) and, uplink channels (Physical Uplink Shared Channel (PUSCH) and Physical Uplink Control Channel (PUCCH)).

PUCCH is an uplink control channel for use in transmitting uplink control information such as a hybrid automatic repeat request (HARQ) ACK/NACK signal, a Channel Quality Indicator (CQI), and a scheduling request (SR).

Meanwhile, 3GPP LTE-A (advanced) as advanced 3GPP LTE is being adopted. There is a multiple input multiple output (MIMO) technology supporting at least 4 antenna ports and carrier aggregation and being introduced in 3GPP LTE-A.

In carrier aggregation, multiple component carriers are used. Component carriers are defined by center frequency and bandwidth. A downlink component carrier or a pair of an uplink component carrier and a downlink component carrier corresponds to one cell. A User Equipment (UE), which is provided with services using multiple downlink component carriers, may be considered as being served by a plurality of serving cells.

In a Time Division Duplex (TDD) system, the frequency of a downlink is the same as that of an uplink. Accordingly, an uplink subframe is associated with one or more downlink subframes. 'Association' means that transmission/reception at the downlink subframe is associated with transmission/reception at the uplink subframe. For example, when a transmission block is received at multiple downlink subframes, a UE sends HARQ ACK/NACK for the transmission block at the uplink subframe associated with the plurality of downlink subframes.

SUMMARY OF THE INVENTION

An object of the present invention is to provide a method for transmitting uplink data.

Another object of the present invention is to provide an apparatus for transmitting uplink data.

To achieve the above objects, according to an aspect of the present invention, an uplink transmission method may comprise transmitting a first ACK/NACK for downlink transmission of a primary cell (P-cell) to the P-cell through a first uplink ACK/NACK channel by a user equipment (UE); and transmitting a second ACK/NACK for downlink transmission of a first secondary cell (S-cell) to the first S-cell through a second uplink ACK/NACK channel by the UE, wherein the first uplink ACK/NACK channel is a channel assigned to an uplink frequency bandwidth of the P-cell, wherein the second uplink ACK/NACK channel is a channel assigned to an uplink frequency bandwidth of the first S-cell, wherein at least one of the first uplink ACK/NACK channel and the second uplink ACK/NACK channel is an ACK/NACK SPS (semi-persistent scheduling) uplink channel semi-persistently assigned by a base station, wherein the ACK/NACK SPS uplink channel is an ACK/NACK SPS PUSCH (physical uplink shared channel) or an ACK/NACK SPS PUCCH (physical uplink shared channel) assigned to an uplink data region, wherein the P-cell and the first S-cell have been carrier-aggregated, and wherein the first S-cell is activated by the P-cell. To achieve the above objects of the present invention, according to another aspect of the present invention, a user equipment (UE) conducting uplink transmission in a wireless communication system, the UE comprising a processor, wherein the processor is implemented to transmit a first ACK/NACK for downlink transmission of a primary cell (P-cell) to the P-cell through a first uplink ACK/NACK channel; and transmit a second ACK/NACK for downlink transmission of a first secondary cell (S-cell) to the first S-cell through a second uplink ACK/NACK channel, wherein the first uplink ACK/NACK channel is a channel assigned to an uplink frequency bandwidth of the P-cell, wherein the second uplink ACK/NACK channel is a channel assigned to an uplink frequency bandwidth of the first S-cell, wherein at least one of the first uplink ACK/NACK channel and the second uplink ACK/NACK channel is an ACK/NACK SPS (semi-persistent scheduling) uplink channel semi-persistently assigned by a base station, wherein the ACK/NACK SPS uplink channel is an ACK/NACK SPS PUSCH (physical uplink shared channel) or an ACK/NACK SPS PUCCH (physical uplink shared channel) assigned to an uplink data region, wherein the P-cell and the first S-cell have been carrier-aggregated, and wherein the first S-cell is activated by the P-cell.

Uplink data transmission efficiency may be improved.

DESCRIPTION OF EXEMPLARY EMBODIMENTS

A user equipment (UE) may be fixed or mobile, and may be referred to as another terminology, such as a user equipment (UE), a mobile station (MS), a mobile terminal (MT), a user terminal (UT), a subscriber station (SS), a wireless device, a personal digital assistant (PDA), a wireless modem, a handheld device, a terminal, a wireless terminal, etc.

A base station (BS) is generally a fixed station that communicates with the UE and may be referred to as another terminology, such as an evolved Node-B (eNB), a base transceiver system (BTS), an access point, etc.

Figure 1:
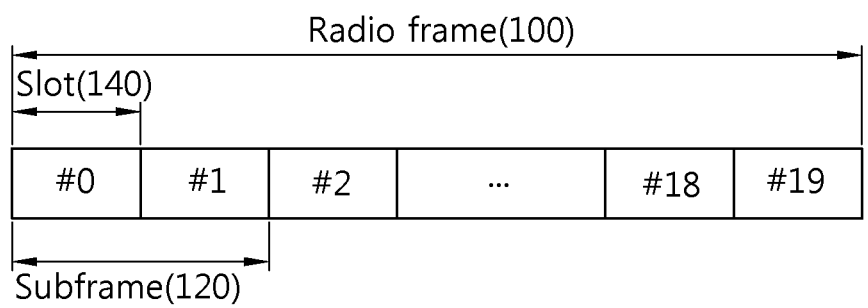
FIG. 1 is a view illustrating the structure of a LTE radio channel.

FIG. 1 shows the structure of a radio frame in 3 GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03).

Referring to FIG. 1, the radio frame includes 10 subframes 120, and one subframe includes two slots 140. The radio frame may be indexed based on slot 140, that is, from slot #0 to #19 or may be indexed based on subframe 120, that is, from subframe #0 to subframe #9. For example, subframe #0 may include slot #0 and slot #1.

A time taken for transmitting one subframe 120 is called a transmission time interval (TTI). The TTI may be a scheduling basis for a data transmission. For example, a radio frame may have a length of 10 ms, a subframe may have a length of 1 ms, and a slot may have a length of 0.5 ms.

One slot 140 includes a plurality of orthogonal frequency division multiplexing (OFDM) symbols in a time domain and a plurality of subcarriers in a frequency domain. In LTE, a BS uses OFDMA as an access method in downlink channel. The OFDM symbols are used to express a symbol period, and may be called by other names depending on a multiple-access scheme. For example, in an uplink channel in which a wireless device transmits data to a BS, a single carrier-frequency division multiple access (SC-FDMA) may be used. The symbol section in which data is transmitted through uplink channel may be referred to as a SC-FDMA symbol.

The structure of radio frame 100 introduced in FIG. 1 is an embodiment for the frame structure. Accordingly, new radio frame format may be defined by changing the number of subframes 120, the number of slots 140 included in the subframe 120, or the number of OFDM symbols included in the slot 140.

In the radio frame structure, the number of symbols included in a slot may be changed depending on which cyclic prefix (CP) is used. For example, when the radio frame uses a normal CP, one slot may include seven OFDM symbols. When the radio frame uses an extended CP, one slot may include six OFDM symbols.

The wireless communication system may be divided into a frequency division duplex (FDD) scheme and a time division duplex (TDD) scheme. According to the FDD scheme, an uplink transmission and a downlink transmission may be performed based on different frequency bands. According to the TDD scheme, an uplink transmission and a downlink transmission may be performed based on the same frequency band by using time division scheme. A channel response of the TDD scheme is substantially reciprocal since it uses the same frequency band. That is, in TDD scheme, a downlink channel response and an uplink channel response are almost the same in a given frequency band. Thus, the TDD-based wireless communication system may obtain the channel state information from the channel state information of uplink channel. In the TDD scheme, the entire frequency band is time-divided for uplink and downlink transmissions, so a downlink transmission by the BS and an uplink transmission by the wireless device cannot be simultaneously performed.

Figure 2:
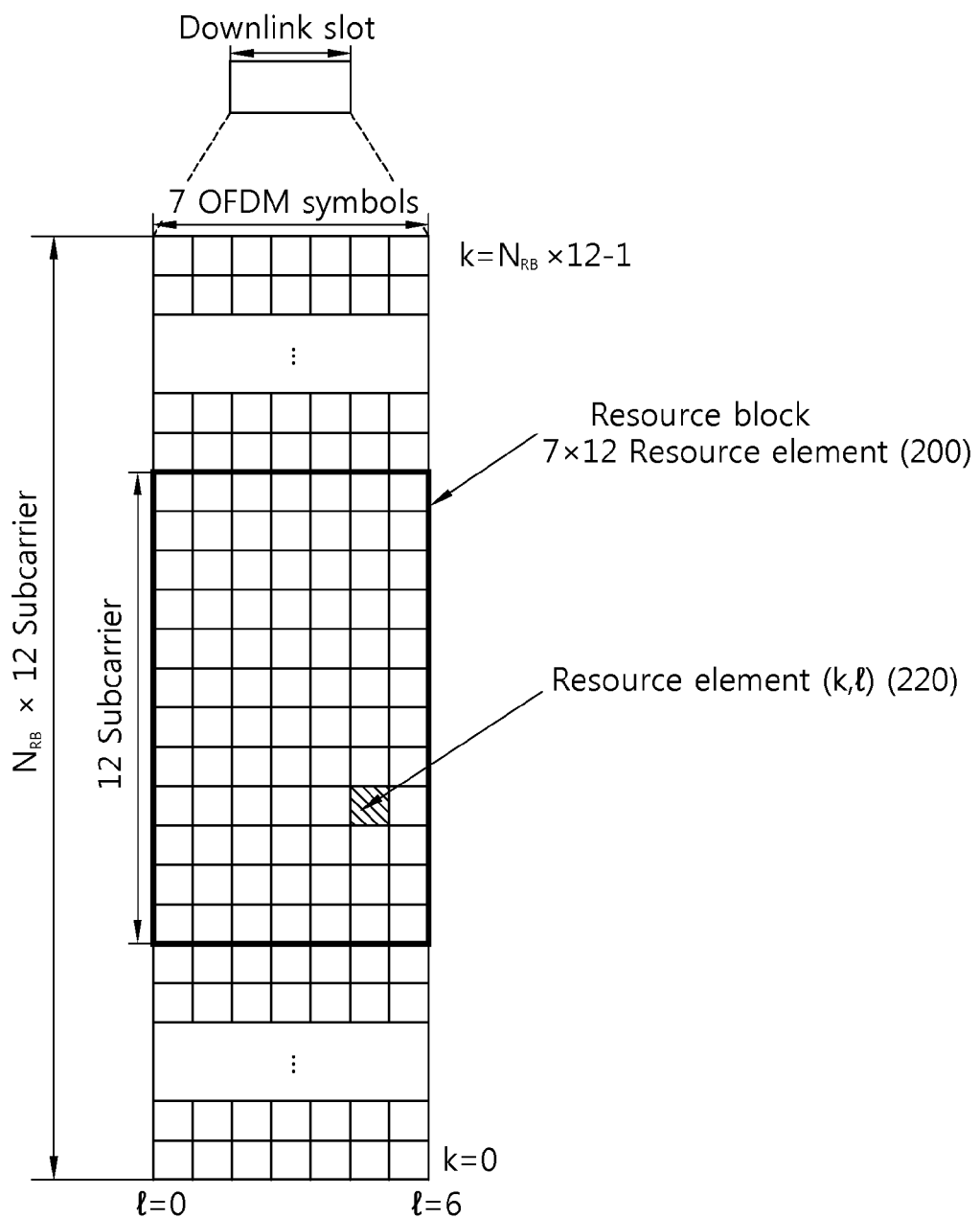
FIG. 2 is a view illustrating an example of a resource grid for a downlink slot.

FIG. 2 is a view illustrating an example of a resource grid for a downlink slot.

The downlink slot includes multiple OFDM symbols in a time domain, and includes NRB resource blocks in a frequency domain. NRB as a number of a resource block within the downlink slot is determined depending on downlink transmission bandwidth configured at a cell. For example, In a LTE system, NRB may be a value of 6 to 110 according to transmission bandwidth in use. A resource block 200 may include a plurality of subcarriers in the frequency domain. An uplink slot may have a structure same as that of the downlink slot.

Each element on the resource grid is referred to as a resource element 200. The resource element 220 on the resource grid can be identified by an index pair (k, l). Here, k (k=0, . . . , NRBx12-1) is the index of the subcarrier in the frequency domain, and l (l=0, . . . , 6) is the indices of the OFDM symbols in the time domain.

Here, one resource block 200 may include 7 OFDM symbols in the time domain and 7×12 resource elements 220 composed of 12 subcarriers in the frequency domain. Such size is just an example, and it is possible that the number of subcarriers and OFDM symbols constructing one resource block 200 varies. The resource block pair indicate a resource unit including two resource blocks.

The number of the OFDM symbols included in one slot may vary depending on CP as mentioned above. In addition, the number of the resource block included in one slot may vary according to the size of the entire frequency bandwidth.

Figure 3:
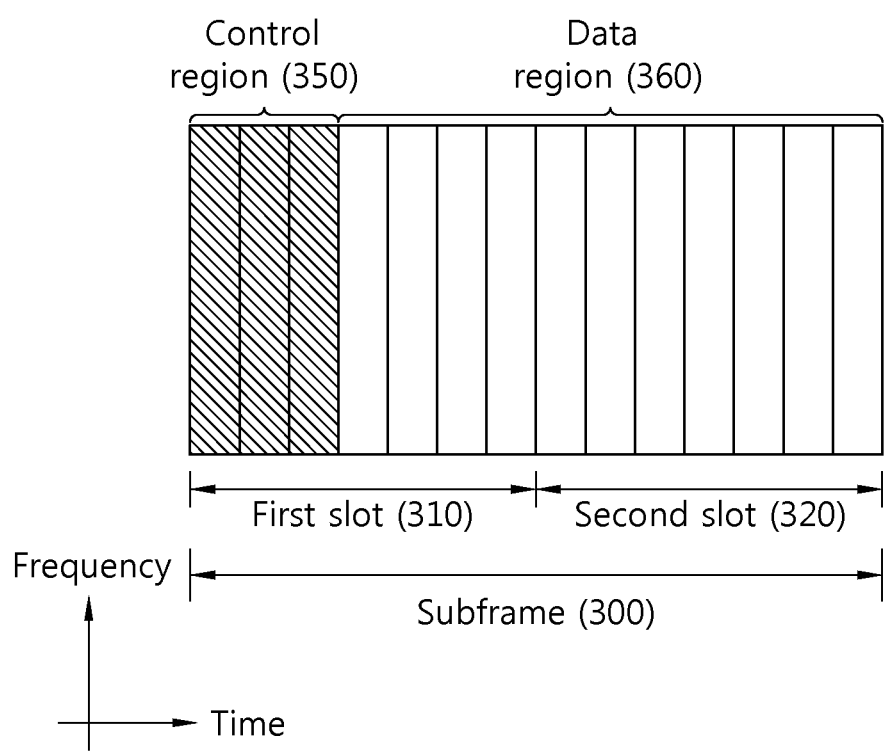
FIG. 3 is a view illustrating the structure of a downlink subframe.

FIG. 3 is a view illustrating the structure of a downlink subframe.

The downlink subframe may be identified by two slots 310, 320 based on time. Each slot 310 or 320 includes 7 OFDM symbols in a normal CP. A resource region corresponding to 3 OFDM symbols (maximum 4 OFDM symbols for 1.4 MHz bandwidth), which arrive first, in the first slot may be used as a control region 350. Remaining OFDM symbols may be used as a data region 360 to which a traffic channel such as a physical downlink shared channel (PDSCH) is assigned.

PDCCH, for example, may be the control channel for transmitting information on resource allocation and a transmit format in a downlink-shared channel (DL-SCH), uplink shared channel (UL-SCH) resource allocation, information on paging on PCH, information on a system on the DL-SCH, and information on resource allocation for upper layer control messages such as random access response over the PDSCH, a transmit power control command set for individual UEs within a random UE group and voice over internet protocol (VoIP) activation. Multiple units for transmitting PDCCH data may be defined within the control region 350. A UE may monitor a plurality of units for transmitting PDCCH data to obtain control data. For example, PDCCH data may be transmitted to the UE based on an aggregation of one or more continuous control channel elements (CCE). The CCE may be one unit for transmitting PDCCH data. The CCE may include a plurality of resource element groups. The resource element group is a resource unit including available 4 resource elements.

A base station determines a PDCCH format based on downlink control information (DCI), and attaches a cyclic redundancy check (CRC) to the control information. The CRC is masked with a unique identifier (referred to as a radio network temporary identifier (RNTI)) according to an owner or a usage. If PDCCH is for a specific UE, a unique identifier of the UE, e.g., C-RNTI (cell-RNTI), may be masked to the CRC. IF PDCCH is for a paging message, an identifier indicating paging, e.g., P-RNTI (paging-RNTI), may be masked to the CRC. If PDCCH is for a system information block (SIB), a system information-RNTI (SI-RNTI)) may be masked to the CRC. In order to indicate random access response as response for a random access preamble of a UE, a random access-RNTI may be masked to the CRC.

Figure 4:
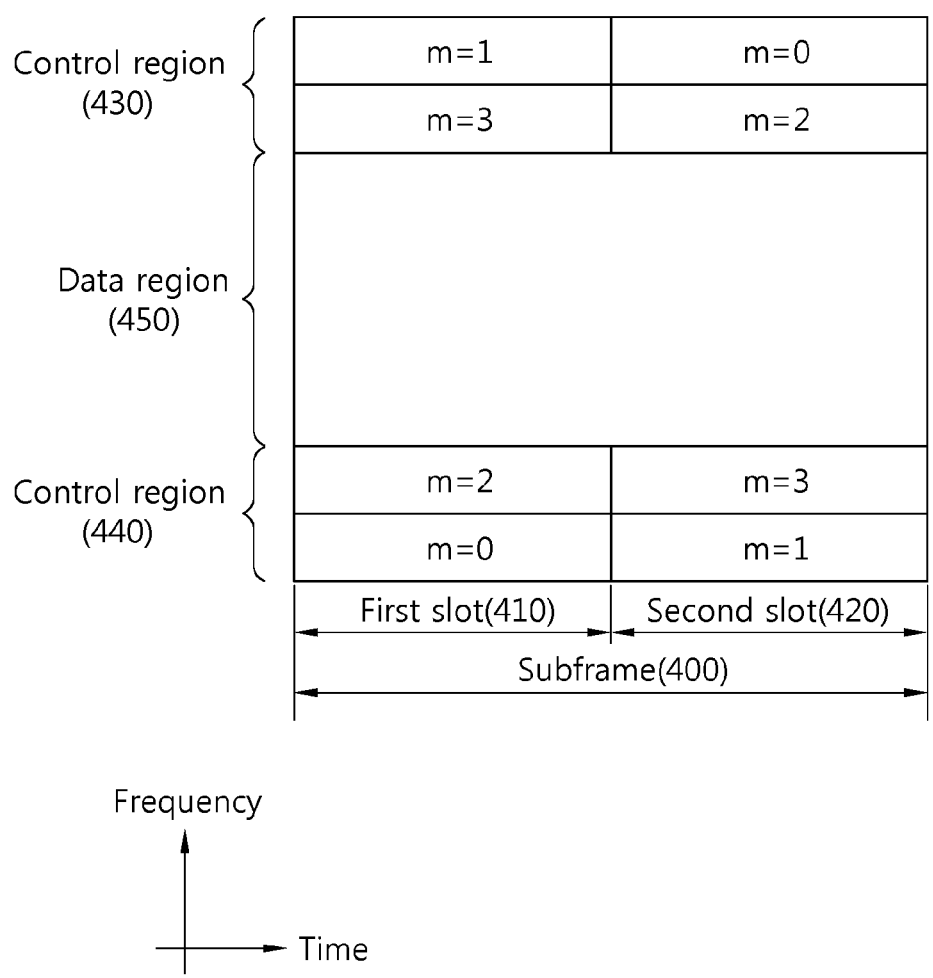
FIG. 4 is a view illustrating the structure of a downlink radio frame in TDD mode in 3GPP LTE.

FIG. 4 shows a downlink radio frame structure in TDD mode.

For the downlink radio frame structure in TDD mode, the section 4 of 3GPP TS 36.211 V8.7.0 (2009-05) "Evolved Universal Terrestrial Radio Access (E-UTRA); Physical Channels and Modulation (Release 8)" may be referred and the downlink radio frame structure in TDD mode is related to a time division duplex (TDD).

A subframe having an index #1 and an index #6 is called a special subframe, and includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is a period for removing interference which occurs in an uplink due to a multi-path delay of a downlink signal between the uplink and downlink.

In TDD, a downlink (DL) subframe and an uplink (UL) subframe co-exist in one radio frame. Table 1 shows an example of a configuration of the radio frame.

TABLE 1

| Uplink-downlink configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' denotes a UL subframe, and 'S' denotes a special subframe. When the UL-DL configuration is received from the BS, the UE can know whether a specific subframe is the DL subframe or the UL subframe according to the configuration of the radio frame.

The PCFICH transmitted in a first OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

Figure 5:
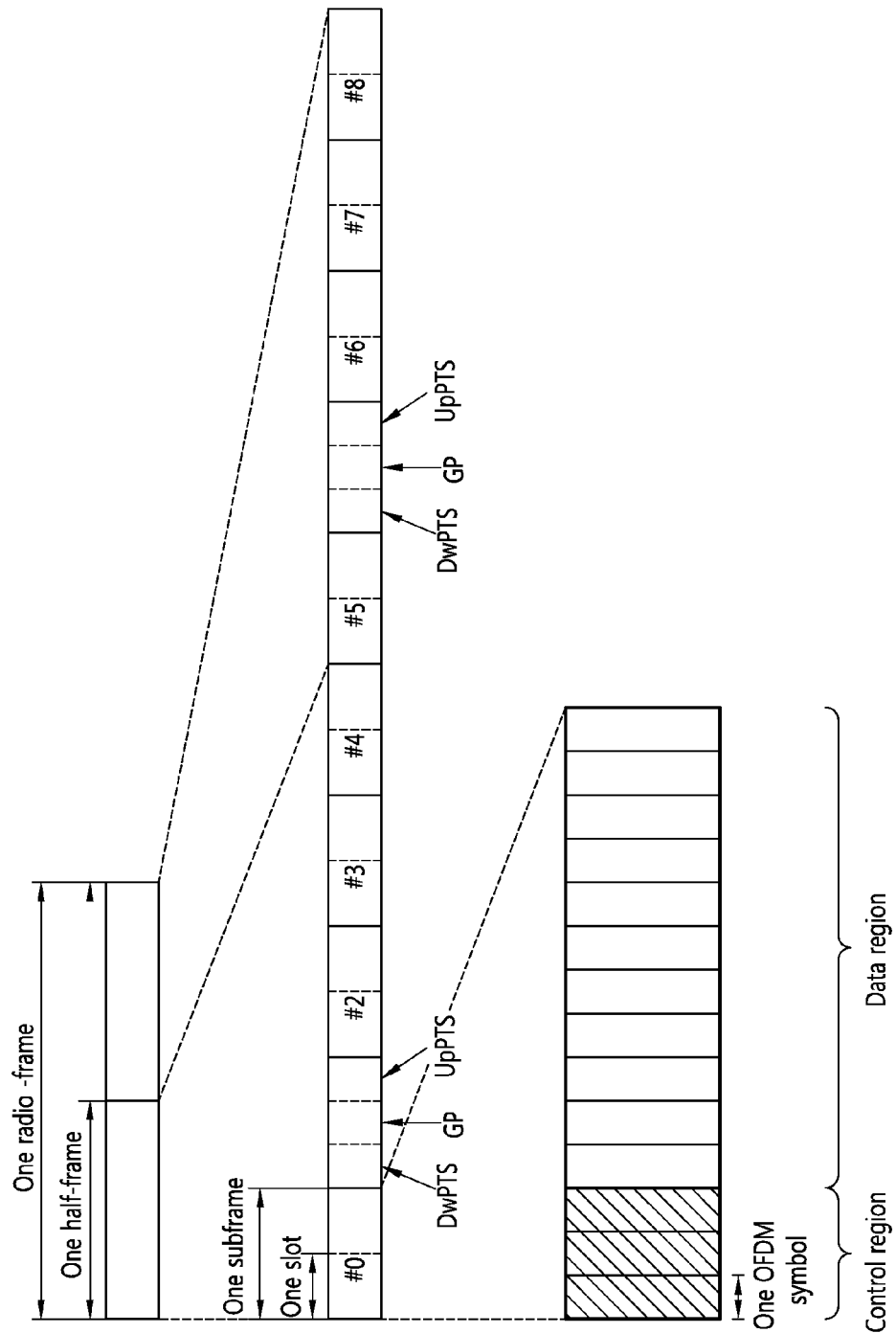
FIG. 5 is a view illustrating the structure of an uplink subframe in 3GPP LTE.

FIG. 5 is a view illustrating the structure of an uplink subframe in 3GPP LTE.

The uplink subframe may be divided into a control region allocated to a physical uplink control channel (PUCCH) for delivering uplink control information and a data region allocated to a physical uplink shared channel (PUSCH) for delivering user data. PUCCH resources for allocation may be located at the edge of bandwidth of a component carrier (CC).

The PUCCH may be allocated based on a RB pair in the subframe. RBs corresponding to the RB pair may be allocated to different subcarriers in a first and a second slots respectively. m is a position index indicating the position of a logical frequency domain of the RB pair which is allocated to the PUCCH in the subframe. RBs having the same value of m are allocated to different subcarriers of the first and second slots.

According to 3GPP TS 36.211 V8.7.0, the PUCCH may have various formats. It is possible to use Different PUCCH formats with different bit numbers in the subframe according to a modulation scheme for use in the PUCCH format.

Table 2 shows an example of bit numbers per subframe and the modulation scheme according to the PUCCH format.

TABLE 2

| PUCCH format | Modulation scheme | bit number per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |
| 3 | QPSK | 48 |

PUCCH format 1 for scheduling request (SR) transmission, PUCCH format 1a/1b for transmitting an ACK/NACK signal for HARQ, PUCCH format 2 for CQI transmission, and PUCCH format 2a/2b for simultaneous transmission of the CQI and the ACK/NACK signals are used. When only the ACK/NACK signal is transmitted in the subframe, PUCCH format 1a/1b is used, and when only the SR is transmitted, PUCCH format 1 is used. When the SR and the ACK/NACK signal are transmitted simultaneously, PUCCH format 1 is used, and the ACK/NACK signal is transmitted after being modulated to resources allocated to the SR.

The entire PUCCH formats use cyclic shift (CS) of a sequence for each OFDM symbol. A base sequence is cyclically shifted by specific CS amount to generate a cyclic shift sequence. The specific CS amount is indicated by a CS index.

The sequence length is equal to the number of an element included in the sequence. The sequence index for indicating the sequence may be determined based on a cell identifier, a slot number within a radio frame, and the like. Assuming that a base sequence is mapped to one resource block in the frequency domain, one resource block includes 12 subcarriers, and thus the length of the base sequence N is 12. The cyclic shift sequence may be generated by cyclically shifting the base sequence.

The available cyclic shift index to the base sequence may be induced from the base sequence based on a CS interval. For example, when the base sequence length is 12 and the CS interval is 2, total number of the available cyclic shift indices to the base sequence is 6. Hereinafter, HARQ ACK/NACK signal transmission in PUCCH format 1b will be described.

Figure 6:
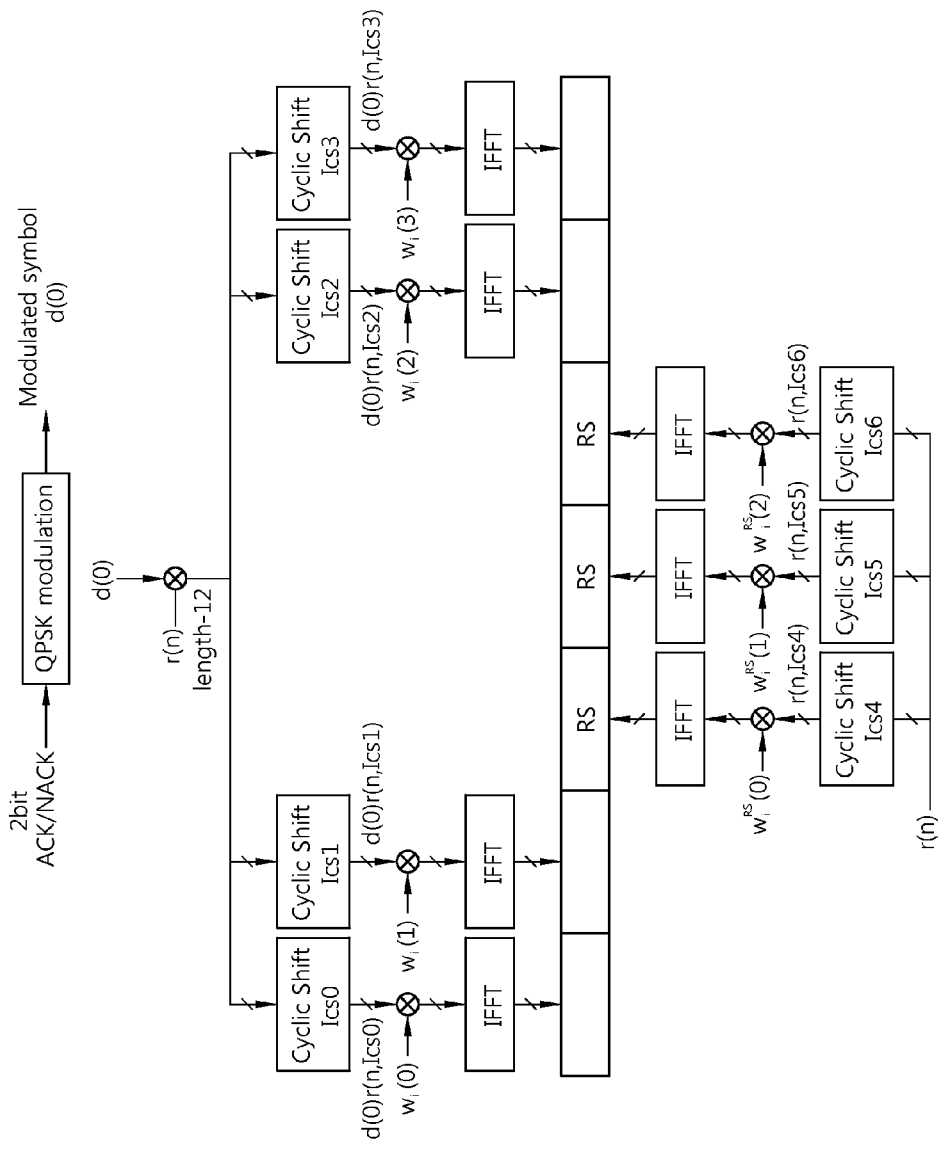
FIG. 6 is a view illustrating PUCCH format 1b for normal CP in 3GPP LTE.

FIG. 6 is a view illustrating PUCCH format 1b for normal CP in 3GPP LTE.

One slot includes 7 OFDM symbols, 3 OFDM symbols are RS OFDM symbols for a reference signal, and 4 OFDM symbols are data OFDM symbols for the ACK/NACK signal.

In PUCCH format 1b, an encoded 2-bit ACK/NACK signal is modulated using Quadrature Phase Shift Keying (QPSK) to generate a modulation symbol (0).

Cyclic shift index $I_{cs}$ may vary according to a slot number $n_s$ in a radio frame and/or a symbol index I in the slot.

Since there are 4 data OFDM symbols for transmitting the ACK/NACK signal in a slot in a normal CP, suppose that the cyclic shift indices corresponding to each data OFDM symbol are $I_{CS0}$, $I_{CS1}$, $I_{CS2}$, $I_{CS3}$.

The modulation symbol d(0) is spread with sequence r(n, $I_{cs}$). When the one-dimensionally spread sequence corresponding to (i+1)th OFDM symbol in the slot is denoted by m(i), it can be expressed as follow {m(0), m(1), m(2), m(3)}={d(0)r(n, $I_{cs0}$), d(0)r(n, $I_{cs1}$), d(0)r(n, $I_{cs2}$), d(0)r(n, $I_{cs3}$)}.

In order to increase UE capacity, the one-dimensionally spread sequence may be spread by using an orthogonal sequence. An orthogonal sequence (where i is a sequence index, 0≤k≤K−1) with a spread factor k=4 uses the following sequence.

TABLE 3

| index | [$w_i(0)$, $w_i(1)$, $w_i(2)$, $w_i(3)$] |
|---|---|
| 0 | [+1 +1 +1 +1] |
| 1 | [+1 −1 +1 −1] |
| 2 | [+1 −1 −1 +1] |

An orthogonal sequence $w_i(k)$ (where i is a sequence index, 0≤k≤K−1) having a spread factor k=3 uses the following sequence.

TABLE 4

| index | [$w_i(0)$, $w_i(1)$, $w_i(2)$] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

A different spread factor can be used for each slot.

Therefore, when any orthogonal sequence index i is given, two-dimensionally spread sequences {s(0), s(1), s(2), s(3)} can be expressed as follows.

$$\{s(0),s(1),s(2),s(3)\}=\{w_i(0)m(0),w_i(1)m(1),w_i(2)m(2),w_i(3)m(3)\}$$

The two-dimensionally spread sequences {s(0), s(1), s(2), s(3)} are subjected to inverse fast Fourier transform (IFFT) and then are transmitted in corresponding OFDM symbols. Accordingly, an ACK/NACK signal is transmitted over the PUCCH.

A reference signal for the PUCCH format 1b is also transmitted by cyclically shifting the base sequence r(n) and then by spreading the same using the orthogonal sequence. When CS indices corresponding to three RS OFDM symbols are denoted by $I_{cs4}$, $I_{cs5}$, $I_{cs6}$, three cyclically shifted sequences r(n,$I_{cs4}$), r(n,$I_{cs5}$), r(n,$I_{cs6}$) can be obtained. The three cyclically shifted sequences are spread by using an orthogonal sequence $w_i^{rs}(k)$ having a spreading factor k=3.

An orthogonal sequence index 1, a CS index $I_{cs}$, and a resource block index m are parameters required to configure the PUCCH and also resources to identify the PUCCH (or UE). If the number of available cyclic shifts is 12 and the number of available orthogonal sequence indices is 3, PUCCHs for total 36 UEs can be multiplexed with one resource block.

In 3GPP LTE, a resource index $n_{PUCCH}^{(1)}$ may be used in order for the UE to induce the aforementioned orthogonal index i, cyclic shift index $n_{PUCCH}^{(1)}$, and the like for configuring the PUCCH. The resource index may be defined to $n_{PUCCH}^{(1)}=n_{CCE}+N_{PUCCH}^{(1)}$, where $n_{CCE}$ is the number of a first CCE used for transmission of DCI (i.e., downlink resource allocation used to receive downlink data corresponding to an ACK/NACK signal), and $N_{PUCCH}^{(1)}$ is a parameter reported by a base station to the UE through a higher-layer message.

Time, frequency, and code resources for use in transmitting the ACK/NACK signal are referred to as ACK/NACK resources or PUCCH resources. As described above, an ACK/NACK resource index (referred to as an ACK/NACK resource index or a PUCCH index) required to transmit the ACK/NACK signal over the PUCCH may be denoted by at least any one of an orthogonal sequence index i, a CS index $I_{cs}$, a resource block index m, and an index for obtaining the three indices.

Figure 7:
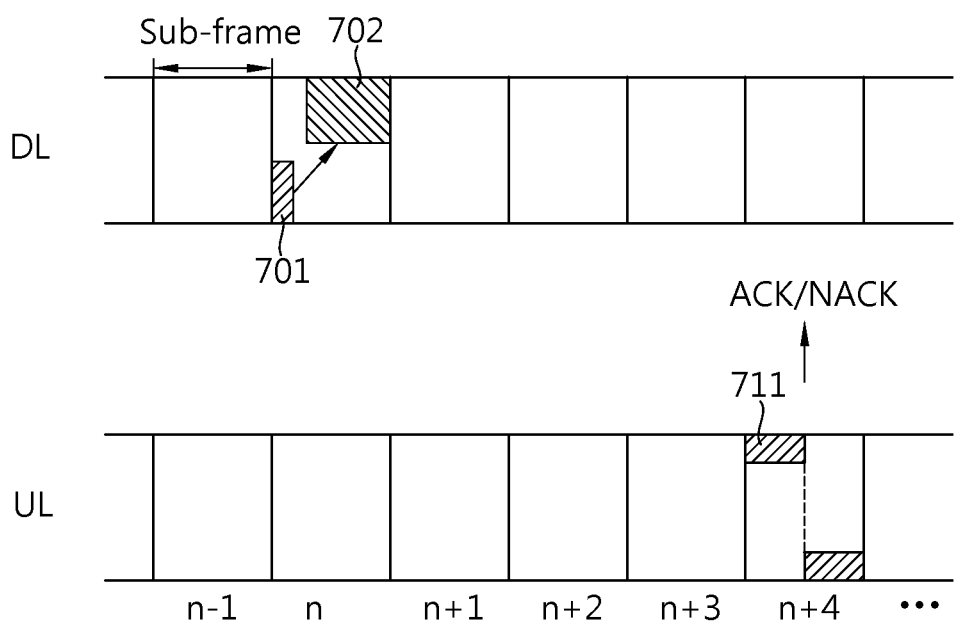
FIG. 7 is a view illustrating an example of HARQ performance.

FIG. 7 is a view illustrating an example of HARQ performance.

By monitoring a PDCCH, a UE receives a DL grant including DL resource allocation over a PDCCH 701 in an $n^{th}$ DL subframe. The UE receives a DL transport block through a PDSCH 702 indicated by the DL resource allocation.

The UE transmits an ACK/NACK response for the DL transport block on a PUCCH 711 in an $(n+4)^{th}$ UL subframe.

The ACK/NACK response can be regarded as reception acknowledgement for the DL transport block.

The ACK/NACK signal may become an ACK signal when the DL transport block is successfully decode, and may become a NACK signal when the DL transport block fails in decoding. Upon reception of the NACK signal, a base station may retransmit the DL transport block when the ACK signal is received or until the number of retransmission reaches its limit.

In the 3GPP LTE, the UE uses a resource allocation of the PUCCH 701 so as to configure a resource index for the PUCCH 711. That is, a lowest CCE index (or a first CCE index) used for transmission of the PDCCH 701 is $n_{CCE}$ and the resource index is determined as $n_{PUCCH}^{(1)} = n_{CCE} + N_{PUCCH}^{(1)}$.

Now, a multiple carrier system will be described.

The 3GPP LTE system supports the configuration in which a downlink bandwidth and an uplink bandwidth are differently configured under the premise that one component carrier is used. The 3GPP LTE system supports up to 20 MHz and the uplink bandwidth may be different from the downlink bandwidth. However, one CC is supported for each of an uplink and a downlink.

Spectrum aggregation (also referred to as bandwidth aggregation or carrier aggregation) supports a plurality of CCs. For example, if 5 CCs are assigned as a granularity of a carrier unit having a bandwidth of 20 MHz, a bandwidth of up to 100 MHz can be supported One DL CC or a pair of a UL CC and a DL CC may correspond to one cell. Therefore, when a UE communicates with a base station through a plurality of DL CCs, it can be said that the UE receives a service from a plurality of serving cells.

Figure 8:
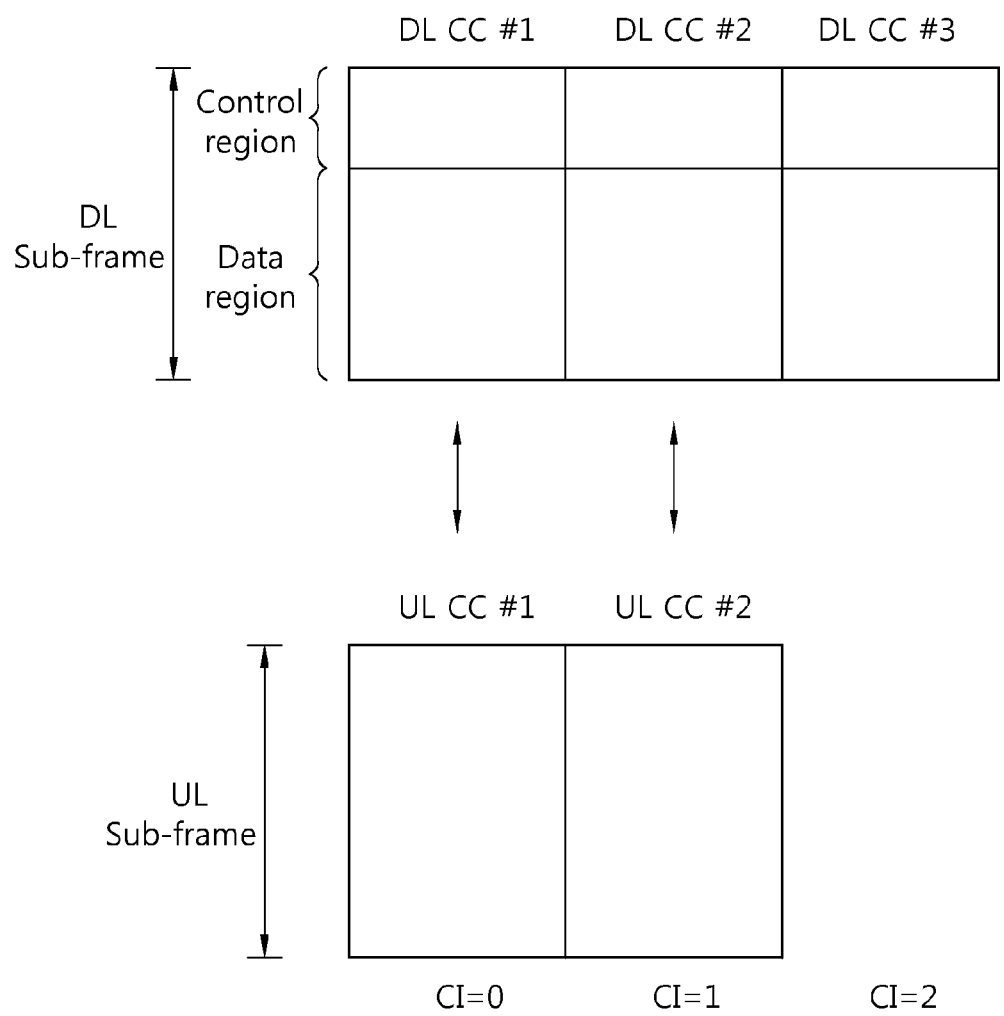
FIG. 8 is a view illustrating an example of multiple carrier.

FIG. 8 is a view illustrating an example of multiple carrier.

Although there are three DL CCs and three UL CCs, the number of DL CCs and the number of UL CCs are not limited thereto. A PDCCH and a PDSCH are independently transmitted in each DL CC. A PUCCH and a PUSCH are independently transmitted in each UL CC. Since three DL CC-UL CC pairs are defined, it can be said that a UE receives a service from three serving cells.

The UE can monitor the PDCCH in a plurality of DL CCs, and can receive a DL transport block simultaneously via the plurality of DL CCs. The UE can transmit a plurality of UL transport blocks simultaneously through a plurality of UL CCs.

It is assumed that a pair of a DL CC #1 and a UL CC #1 is a first serving cell, a pair of a DL CC #2 and a UL CC #2 is a second serving cell, and a DL CC #3 is a third serving cell. Each serving cell can be identified through a cell index (CI). The CI may be cell-specific or UE-specific. Here, CI=0, 1, 2 are assigned to the first to third serving cells for example.

The serving cell can be classified into a primary cell and a secondary cell. The primary cell operates at a primary frequency, and is a cell designated as the primary cell when the UE performs an initial connection establishment process or starts a connection reestablishment process or performs a handover process. The primary cell is also called a reference cell. The secondary cell operates at a secondary frequency. The secondary cell can be configured after an RRC connection is established, and can be used to provide an additional radio resource. At least one primary cell is always configured. The secondary cell can be added/modified/released by using higher-layer signaling (e.g., RRC messages), and can be activated by the primary cell.

A CI of the primary cell may be fixed. For example, a lowest CI can be designated as the CI of the primary cell. It is assumed hereinafter that the CI of the primary cell is 0 and a CI of the secondary cell is allocated in consecutive order starting from 1.

Now, ACK/NACK transmission for HARQ in 3GPP LTE time division duplex (TDD) will be described In the TDD, an uplink subframe and a downlink subframe coexist in one radio frame, unlike in frequency division duplex (FDD). In general, the number of uplink subframes is less than the number of downlink subframes. Therefore, in preparation for a case in which the uplink subframes for transmitting an ACK/NACK signal are insufficient, it is supported that a plurality of ACK/NACK signals for a plurality of downlink transport blocks are transmitted in one uplink subframe.

According to the section 10.1 of 3GPP TS 36.213 V8.7.0 (2009-05), two ACK/NACK modes of channel selection and bundling are disclosed.

First, the bundling is an operation in which, if all of PDSCHs (i.e., DL transport blocks) received by a UE are successfully decoded, ACK is transmitted, and otherwise NACK is transmitted. This is called an AND operation.

However, the bundling is not limited to the AND operation, and may include various operations for compressing ACK/NACK bits corresponding to a plurality of transport blocks (or codewords). For example, the bundling may indicate a count indicating the number of ACKs (or NACKs) or the number of consecutive ACKs.

Second, the channel selection is also called ACK/NACK multiplexing. The UE transmits the ACK/NACK by selecting one of a plurality of PUCCH resources.

Table 5 below shows a DL subframe n-k associated with a UL subframe n according to the UL-DL configuration in the 3GPP LTE. Here, k∈K, where M denotes the number of elements of a set K.

TABLE 5

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Suppose that M DL subframes are associated with a UL subframe n, where M=3. Since 3 PDCCHs can be received from 3 DL subframes, the UE can acquire 3 PUCCH resources ($n^{(1)}_{PUCCH,0}$, $n^{(1)}_{PUCCH,1}$, $n^{(1)}_{PUCCH,2}$, $n^{(1)}_{PUCCH,3}$). When b(0), b(1) denotes an encoded 2-bit ACK/NACK, an example of channel selection is shown in Table 6 below.

TABLE 6

| HARQ-ACK(1), HARQ-ACK(2), HARQ-ACK(3), HARQ-ACK(4) | Resource Index | b(0) b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |

TABLE 6-continued

| HARQ-ACK(1), HARQ-ACK(2), HARQ-ACK(3), HARQ-ACK(4) | Resource Index | b(0) | b(1) |
|---|---|---|---|
| NACK/DTX, NACK/DTX, NACK, DTX | $n_{PUCCH,2}^{(1)}$ | 1 | 1 |
| ACK, ACK, NACK/DTX, ACK | $n_{PUCCH,1}^{(1)}$ | 1 | 0 |
| NACK, DTX, DTX, DTX | $n_{PUCCH,0}^{(1)}$ | 1 | 0 |
| ACK, ACK, NACK/DTX, NACK/DTX | $n_{PUCCH,1}^{(1)}$ | 1 | 0 |
| ACK, NACK/DTX, ACK, ACK | $n_{PUCCH,3}^{(1)}$ | 0 | 1 |
| NACK/DTX, NACK/DTX, NACK/DTX, NACK | $n_{PUCCH,3}^{(1)}$ | 1 | 1 |
| ACK, NACK/DTX, ACK, NACK/DTX | $n_{PUCCH,2}^{(1)}$ | 0 | 1 |
| ACK, NACK/DTX, NACK/DTX, ACK | $n_{PUCCH,0}^{(1)}$ | 0 | 1 |
| ACK, NACK/DTX, NACK/DTX, NACK/DTX | $n_{PUCCH,0}^{(1)}$ | 1 | 1 |
| NACK/DTX, ACK, ACK, ACK | $n_{PUCCH,3}^{(1)}$ | 0 | 1 |
| NACK/DTX, NACK, DTX, DTX | $n_{PUCCH,1}^{(1)}$ | 0 | 0 |
| NACK/DTX, ACK, ACK, NACK/DTX | $n_{PUCCH,2}^{(1)}$ | 1 | 0 |
| NACK/DTX, ACK, NACK/DTX, ACK | $n_{PUCCH,3}^{(1)}$ | 1 | 0 |
| NACK/DTX, ACK, NACK/DTX, NACK/DTX | $n_{PUCCH,1}^{(1)}$ | 0 | 1 |
| NACK/DTX, NACK/DTX, ACK, ACK | $n_{PUCCH,3}^{(1)}$ | 0 | 1 |
| NACK/DTX, NACK/DTX, ACK, NACK/DTX | $n_{PUCCH,2}^{(1)}$ | 0 | 0 |
| NACK/DTX, NACK/DTX, NACK/DTX, ACK | $n_{PUCCH,3}^{(1)}$ | 0 | 0 |
| DTX, DTX, DTX, DTX | N/A | N/A | |

HARQ-ACK(i) denotes ACK/NACK for an $i^{th}$ DL subframe among the M DL subframes. Discontinuous transmission (DTX) implies that a DL transport block cannot be received on a PDSCH in a corresponding DL subframe or a corresponding PDCCH cannot be detected.

For example, if four DL transport blocks in four DL subframes are successfully received, the UE modulates bits (1,1) through QPSK by using $n_{PUCCH,1}^{(1)}$ and transmits the modulated bits through an ACK/NACK response by using the PUCCH format 1b. If the UE fails to decode the DL transport block and successfully decodes the remaining transport blocks in a first (i=0) DL subframe, the UE modulates bits (0,1) through QPSK by using $n_{PUCCH,3}^{(1)}$ and transmits the modulated bits through an ACK/NACK response by using the PUCCH format 1b.

The existing PUCCH format 1b can transmit only 2-bit ACK/NACK. However, channel selection is used to send information on more ACK/NACK states by linking the allocated PUCCH resources and an actual ACK/NACK signal.

Meanwhile, if it is assumed that M DL subframes are associated with a UL subframe n, ACK/NACK may be mismatched between the base station and the UE due to missing of the DL subframe (or PDCCH).

Assume that M=4, and the base station transmits 4 DL transport blocks via four DL subframes. The UE misses the PDCCH in the $2^{nd}$ DL subframe and thus cannot receive a $2^{nd}$ transport block at all, and can receive only the remaining $1^{st}$ stand $3^{rd}$ transport blocks. In this case, if bundling is used, the UE erroneously transmits ACK.

In order to solve this error, a downlink assignment index (DAI) is included in a DL grant on the PDCCH. The DAI indicates an accumulative value of the PDCCH which transmits a PDSCH allocated thereto. A value of the 2-bit DAI is increased in an orderly manner starting from 1, and a modulo-4 operation can be applicable again from DAI=4. If M=5 and all of 5 DL subframes are scheduled, the DAI can be included in a corresponding PDCCH in the order of DAI=1, 2, 3, 4, 1.

When considering a TDD configuration with DL:UL=9:1, a DAI value to which the modulo-4 operation is applied can be expressed as follows.

Figure 9:
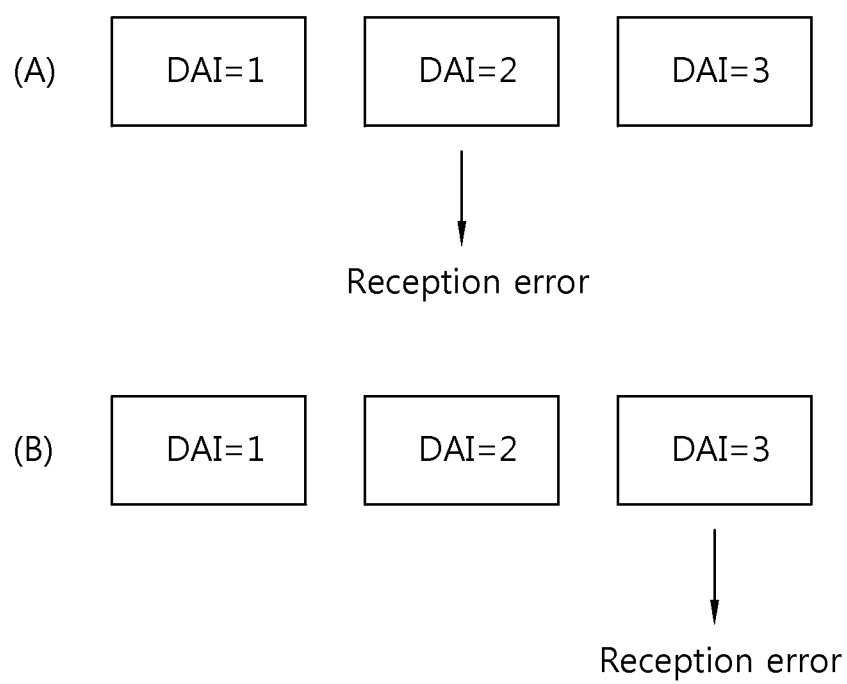
FIG. 9 is a view illustrating examples of error detection using DAI.

DAI=1 for 1st, 5th or 9th scheduled PDSCH
DAI=2 for 2nd or 6th scheduled PDSCH
DAI=3 for 3rd or 7th scheduled PDSCH
DAI=4 for 4th or 8th scheduled PDSCH FIG. 9 is a view illustrating examples of error detection using DAI.

In FIG. 9A, a UE misses a $2^{nd}$ DL subframe, and thus cannot receive DAI=2. In this case, the UE receives DAI=3, and thus can recognize missing of a DL subframe corresponding to DAI=2.

In FIG. 9B, the UE misses a $3^{rd}$ DL subframe, and thus cannot receive DAI=3. In this case, the UE cannot recognize missing of the $3^{rd}$ DL subframe. However, in 3GPP LTE, a PUCCH is configured on the basis of a $1^{st}$ CCE of a last received PDCCH so that a base station can recognize missing of the DL subframe. That is, the UE transmits ACK/NACK by using a PUCCH resource based on a PUCCH resource of a DL subframe corresponding to DAI=2. The base station can recognize the missing of the $3^{rd}$ DL subframe since the ACK/NACK is received by using the PUCCH resource corresponding to the DL subframe with DAI=2 rather than the DL subframe with DAI=3.

Meanwhile, as a plurality of serving cells are used, an additional PUCCH format 3 is under discussion in addition to the PUCCH format of the existing 3GPP LTE, in preparation for a case in which the number of ACK/NACK bits is insufficient.

Figure 10:
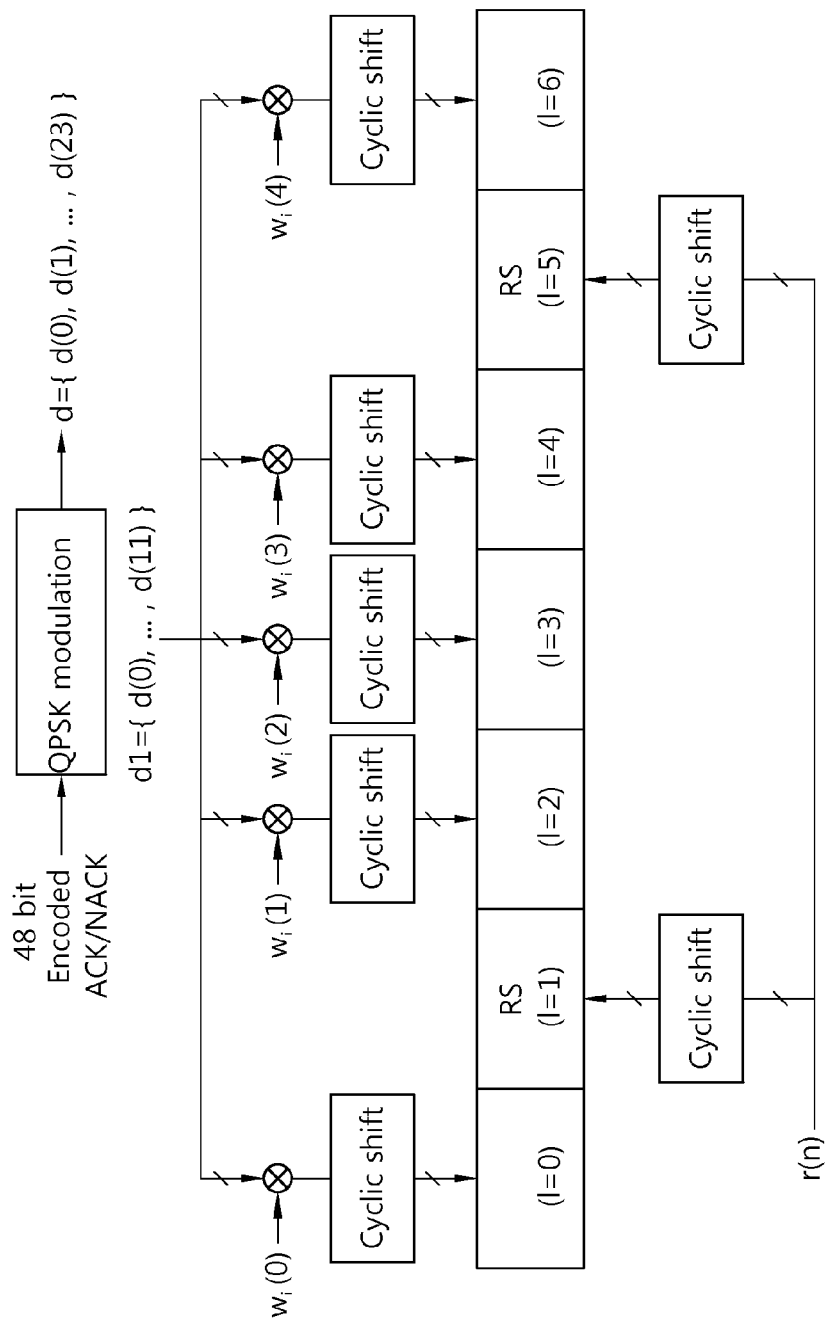
FIG. 10 is a view illustrating an exemplary structure of PUCCH format 3 in normal CP.

FIG. 10 is a view illustrating an exemplary structure of PUCCH format 3 in a normal CP.

One slot includes 7 OFDM symbols. 1 denotes an OFDM symbol number in the slot, and has a value in the range of 0 to 6. Two OFDM symbols with l=1, 5 are used as RS OFDM symbols for a reference signal, and the remaining OFDM symbols are used as data OFDM symbols for an ACK/NACK signal.

A symbol sequence d={d(0), d(1), d(23)} is generated by performing QPSK modulation on a 48-bit encoded ACK/NACK signal. d(n)(n=0, 1, ..., 23) is a complex-valued modulation symbol. The symbol sequence d can be regarded as a set of modulation symbols. The number of bits of the ACK/NACK signal or a modulation scheme is for exemplary purposes only, and thus the present invention is not limited thereto.

One PUCCH uses one RB, and one subframe includes a first slot and a second slot. A symbol sequence d={d(0), d(1), d(23)} is divided into two sequences d1={d(0), ..., d(11)} and d2={d(12), ..., d(23)}, each having a length of 12. The first sequence d1 is transmitted in the first slot, and the second sequence d2 is transmitted in the second slot. FIG. 5 shows that the first sequence d1 is transmitted in the first slot.

The symbol sequence is spread with an orthogonal sequence $w_i$. Symbol sequences correspond to respective data OFDM symbols. An orthogonal sequence is used to identify a PUCCH (or UE) by spreading the symbol sequence across the data OFDM symbols.

The orthogonal sequence has a spreading factor K=5, and includes five elements, One of five orthogonal sequences of Table 5 below can be selected as the orthogonal sequence in accordance with an orthogonal sequence index i.

TABLE 7

| index i | [$w_i(0)$, $w_i(1)$, $w_i(2)$, $w_i(3)$, $w_i(4)$] |
|---|---|
| 0 | [1 1 1 1 1] |
| 1 | [1 $e^{j2\pi/5}$ $e^{j4\pi/5}$ $e^{j6\pi/5}$ $e^{j8\pi/5}$] |
| 2 | [1 $e^{j4\pi/5}$ $e^{j8\pi/5}$ $e^{j2\pi/5}$ $e^{j6\pi/5}$] |
| 3 | [1 $e^{j6\pi/5}$ $e^{j2\pi/5}$ $e^{j8\pi/5}$ $e^{j4\pi/5}$] |
| 4 | [1 $e^{j8\pi/5}$ $e^{j6\pi/5}$ $e^{j4\pi/5}$ $e^{j2\pi/5}$] |

Two slots in the subframe can use different orthogonal sequence indices.

Each spread symbol sequence is cyclically shifted by a cell-specific CS value $n_{cs}^{cell}(n_s,l)$. Each cyclically shifted symbol sequence is transmitted by being mapped to a corresponding data OFDM symbol.

$n_{cs}^{cell}(n,l)$ is a cell-specific parameter determined by a pseudo-random sequence which is initialized on the basis of a physical cell identity (PCI). $n_{cs}^{cell}(n_s,l)$ varies depending on a slot number $n_s$ in a radio frame and an OFDM symbol number l in a slot.

Two RS OFDM symbols are transmitted by mapping an RS sequence used for demodulation of an ACK/NACK signal.

As described above, since the ACK/NACK signal is spread with an orthogonal sequence having a spreading factor K=5, up to five UEs can be identified by changing an orthogonal sequence index. This implies that up to five PUCCH formats 3 can be multiplexed in the same RB.

A resource index for the PUCCH formats 1a/1b is acquired from a resource of a PDCCH received most recently. A resource index for the PUCCH format 3 is indicated by an ACK/NACK resource indicator (ARI).

First, the base station notifies the UE of a plurality of available candidate resource indices by using a higher layer message such as an RRC message. Further, the base station reports a resource index selected from the plurality of candidate resource indices through a DL grant on a PDCCH. A field indicating the selected resource index in the DL grant is called an ARI.

For example, the base station reports four candidate resource indices to the UE through the RRC message. Further, the base station uses the ARI on the PDCCH for scheduling the PDSCH to indicate one of the four candidate resource indices. The PUCCH format 3 is determined from the selected resource index.

In order to prevent the increase in the number of bits of the DL grant, the ARI uses a transmit power command (TPC) of the conventional DCI.

Hereinafter, semi-persistent scheduling (SPS) will be described.

In general, a UE first receives a DL grant on a PDCCH, and subsequently receives a transport block through a PDSCH indicated by the DL grant. This implies that PDCCH monitoring is accompanied in every transport block, which is called dynamic scheduling. The SPS pre-defines a PDSCH resource, and the UE receives a transport block through the pre-defined resource without PDCCH monitoring.

Figure 11:
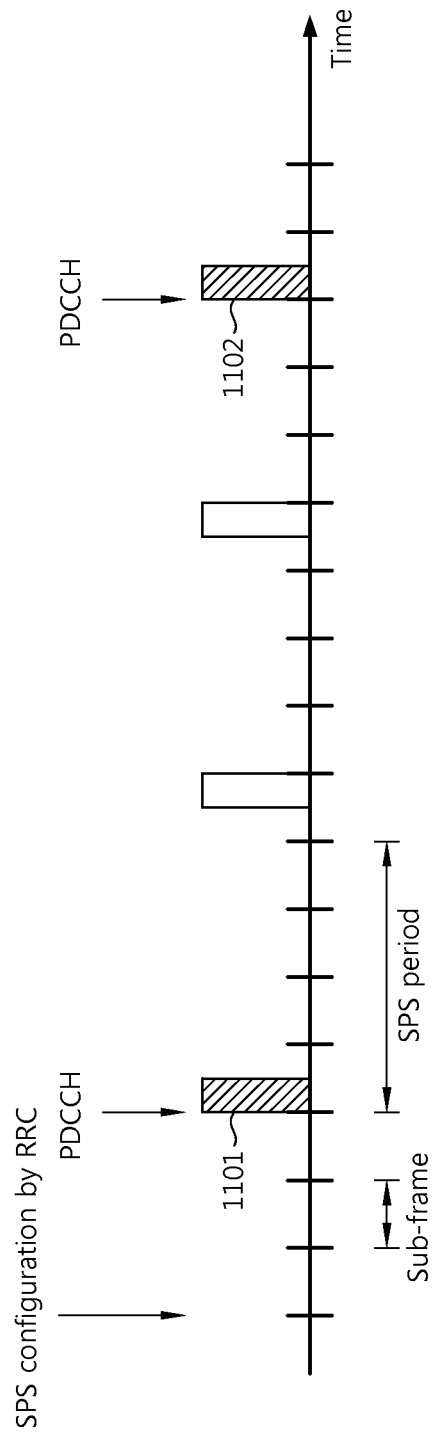
FIG. 11 is a view illustrating an exemplary SPS in 3GPP LTE.

FIG. 11 is a view illustrating an exemplary SPS in 3GPP LTE.

Although FIG. 11 shows DL SPS, the same is also applicable to UL SPS.

First, a base station sends an SPS configuration to a UE by using a radio resource control (RRC) message. The SPS configuration includes an SPS-C-RNTI and an SPS period. It is assumed herein that the SPS period is four subframes.

Even if the SPS is configured, the SPS is not immediately performed. The UE may monitor a PDCCH 501 in which a CRC is masked with the SPS-C-RNTI, and may receive downlink data based on the SPS after determining to activate the SPS. When NDI=0 is included in DCI on the PDCCH 801, combinations of values of several fields (e.g., a transmit power command (TPC), a cyclic shift (CS) of a demodulation reference signal (DM-RS) a modulation and coding scheme (MCS), a redundancy version (RV), an HARQ process number, and a resource allocation) included in the DCI are used for determining SPS activation and deactivation. More details will be further described.

When the SPS is activated, even if a DL grant on the PDCCH is not received, the UE can receive a transport block on a PDSCH at an SPS period. The PDSCH received without the PDCCH is called an SPS PDSCH.

Afterwards, the UE monitors a PDCCH 802 in which a CRC is masked with the SPS-C-RNTI, and confirms deactivation of the SPS.

According to 3GPP LTE, the PDCCH indicating the activation of the SPS does not require an ACK/NACK response, but the PDCCH indicating the deactivation of the SPS requires the ACK/NACK response. Hereinafter, a DL transport block may include the PDCCH indicating the deactivation of the SPS.

As per existing PUCCH formats 1a/1b, the resource index $n^{(1)}_{PUCCH}$ is obtained from PDCCH. However, according to SPS scheduling, no PDCCH connected with PDSCH is received, a pre-assigned resource index is used.

For the SPS, the base station reports a plurality of candidate resource indices to the UE through a RRC message. The base station reports a resource index in use among the plurality of candidate resource indices to the UE through the PDCCH 501 which activates the SPS.

The UE can determine effectiveness of the SPS PDCCH when the SPS PDCCH meets the following conditions.

1) When CRC parity bits for PDCCH payload are scrambled with SPS C-RNTI,

2) When NDI set to 0 and DCI format 2, 2A, 2B and 2C are given, a NDI field can refer one for an available transport block.

If all the fields for each DCI are set to values as specified in Table 8 and 9 below, validation can be acquired.

TABLE 8

The special fields for SPS activation

| | DCI format 0 | DCI format 1/1A | DCI format 2/2A/2B/2C |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |

TABLE 8-continued

The special fields for SPS activation

| | DCI format 0 | DCI format 1/1A | DCI format 2/2A/2B/2C |
|---|---|---|---|
| Redundancy version | N/A | set to '00' | For the enabled transport block: set to '00' |

TABLE 9

The special fields for SPS release

| | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

When the SPS PDCCH becomes valid as a result of determination, the UE may determine whether to activate or release SPS based on received DCI information.

If validation is not achieved, the received DCI format may be regarded by the UE as having been received with a non-matching CRC.

In case the DCI format indicates activation of the downlink SPS, the TPC command for the PUCCH field may be used to indicate the index for one of the four PUCCH resources configured by a higher layer.

Table 10 shows PUCCH resources for the downlink SPS.

TABLE 10

| Value of 'TPC command for PUCCH' | $n_{PUCCH}^{(1,p)}$ |
|---|---|
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers |

Hereinafter, in an embodiment of the present invention, a downlink channel used in a LTE system will be described.

Figure 12:
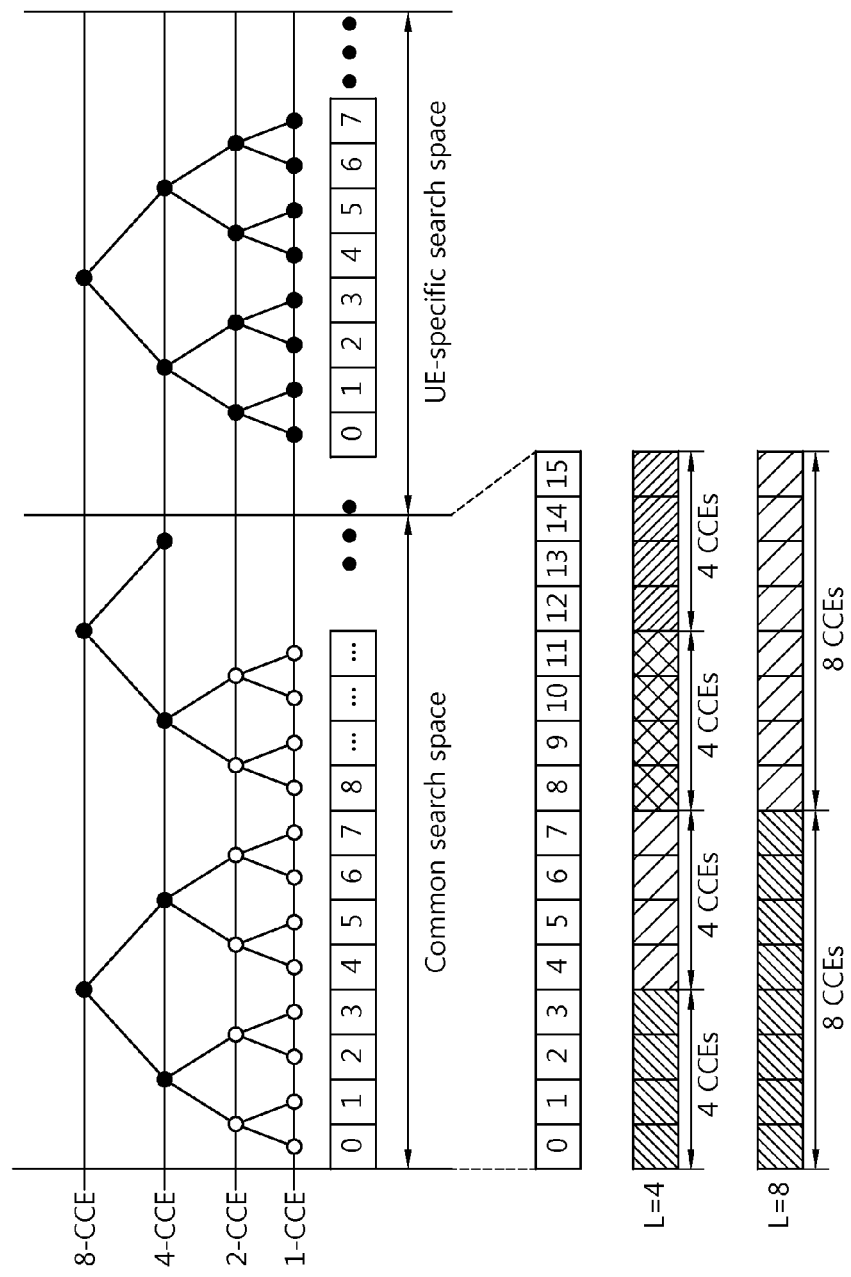
FIG. 12 is a view illustrating an example of monitoring PDCCH.

FIG. 12 is a view illustrating an example of monitoring PDCCH.

For a PDCCH monitoring procedure, refer to 3GPP TS 36.213 V10.2.0 (2011-06), Ch. 9.

A UE can perform blind decoding for detecting the PDCCH. Blind decoding is a scheme in which a desired identifier is demasked to the CRC of a received PDCCH (referred to as a candidate PDCCH) and CRC error check is conducted so as to identify whether the corresponding PDCCH is its own control channel. The terminal is not aware of CCE aggregation level or DCI format for transmission and a position at which its PDCCH data is transmitted in a control region.

A plurality of PDCCHs may be transmitted in one sub-frame. The UE monitors a plurality of PDCCHs at every sub-frame. Here, the term "monitoring" refers to the UE attempting to perform blind decoding on a PDCCH.

In 3GPP LTE, the UE uses a search space for reducing load caused by blind decoding. The search space may be regarded as CCEs' monitoring set for searching a PDCCH. The UE monitors the PDCCH based on the search space.

The search space is divided into a common search space and a UE-specific search space. The common search space is a space for searching a PDCCH having common control information and consists of 16 CCEs, CCE index 0 to 15, and supports PDCCHs having a CCE aggregation level of {4, 8}. However, a PDCCH (DCI formats 0 and 1A) for carrying UE-specific information may be transmitted even in the common search space. The UE-specific search space supports PDCCHs having a CCE aggregation level of {1, 2, 4, 8}.

The following table shows the number of PDCCH candidates that are monitored by the UE.

TABLE 11

| Type | Search space $S_k^{(L)}$ Aggregation level L | Size [in CCEs] | Number of PDCCH candidates $M^{(L)}$ | DCI Format |
|---|---|---|---|---|
| UE-specific | 1 | 6 | 6 | 0, 1, 1A, 1B, |
| | 2 | 12 | 6 | 1D, 2, 2A |
| | 4 | 8 | 2 | |
| | 8 | 16 | 2 | |
| Common | 4 | 16 | 4 | 0, 1A, 1C, 3/3A |
| | 8 | 16 | 2 | |

The size of a search space is determined according to Table 11 above, and the start point of a search space is defined differently for each of the common search space and UE-specific search space. The start point of the common search space is fixed regardless of any sub-frame, but the start point of the UE-specific search space may vary per sub-frame depending on the UE identifier (e.g., C-RNTI), CCE aggregation level and/or slot number in a radio frame. In case the start point of the UE-specific search space is positioned in the common search space, the UE-specific search space and the common search space may overlap.

An aggregation of PDCCH candidates monitored by the UE may be defined on the basis of a search space. In an aggregation level 1, 2, 4 or 8, search space SP is defined as a set of PDCCH candidates. The CCE corresponding to PDCCH candidate m in search space $S_k^{(L)}$ is given as follows:

$$L\{(Y_k+m') \bmod \lfloor N_{CCE,k}/L \rfloor\}+i \qquad \text{Equation 1}$$

Here, i=0, . . . L−1, and in case the search space is the common search space, m'=m. In case the search space is a specific search space, and a carrier indicator field(CIF) is configured to the UE, m'=m+$M^{(L)}$·$n_{CI}$, $n_{CI}$ is a value of the configured CIF. If the CIF is not configured to the UE, m'=m. Here, it is m=0, . . . $M^{(L)}$−1 and $M^{(L)}$ is the number of the PDCCH candidates for monitoring the given search space.

In the common search space, $Y_k$ is set as 0 for two aggregation levels, L=4 and L=8. In the UE-specific search space of aggregation level L, variable $Y_k$ is defined as follows:

$$Y_k = (A \cdot Y_{k-1}) \bmod D \qquad \text{Equation 2}$$

Here, $Y_{-1} = n_{RNTI} \neq 0$, A=39827, D=65537, k=$\lfloor n_s/2 \rfloor$, and $n_s$ is a slot number in a radio frame.

When a wireless device monitors the PDCCH based on the C-RNTI, a DCI format, and a search space are determined according to a PDSCH transmission mode. Table 12 below shows an example of monitoring PDCCH in which the C-RNTI is configured.

TABLE 12

| Transmission mode | DCI format | Search Space | Transmission mode of PDSCH corresponding to PDCCH |
|---|---|---|---|
| Mode 1 | DCI format 1A | Common and UE specific | Single-antenna port, port 0 |
|  | DCI format 1 | UE specific | Single-antenna port, port 0 |
| Mode 2 | DCI format 1A | Common and UE specific | Transmit diversity |
|  | DCI format 1 | UE specific | Transmit diversity |
| Mode 3 | DCI format 1A | Common and UE specific | Transmit diversity |
|  | DCI format 2A | UE specific | Cyclic Delay Diversity(CDD) or Transmit diversity |
| Mode 4 | DCI format 1A | Common and UE specific | Transmit diversity |
|  | DCI format 2 | UE specific | Closed-loop spatial multiplexing |
| Mode 5 | DCI format 1A | Common and UE specific | Transmit diversity |
|  | DCI format 1D | UE specific | Multi-user Multiple Input Multiple Output(MU-MIMO) |
| Mode 6 | DCI format 1A | Common and UE specific | Transmit diversity |
|  | DCI format 1B | UE specific | Closed-loop spatial multiplexing |
| Mode 7 | DCI format 1A | Common and UE specific | If the number of PBCH transmit ports is one, single-antenna port, port 0 is used, otherwise Transmit diversity |
|  | DCI format 1 | UE specific | Single-antenna port, port 5 |
| Mode 8 | DCI format 1A | Common and UE specific | If the number of PBCH transmit ports is one, single-antenna port, port 0 is used, otherwise Transmit diversity |
|  | DCI format 2B | UE specific | Dual layer transmit, port 7 or 8 or single-antenna port, port 7 or 8 |

Uses of DCI formats can be classified as shown in the following table.

TABLE 13

| DCI format | Description |
|---|---|
| DCI format 0 | used for the scheduling of PUSCH |
| DCI format 1 | used for the scheduling of PDSCH codeword |
| DCI format 1A | used for the compact scheduling of one PDSCH codeword and random access procedure |
| DCI format 1B | used for the compact scheduling of one PDSCH codeword with precoding information |
| DCI format 1C | used for the compact scheduling of one PDSCH codeword |
| DCI format 1D | used for the compact scheduling of one PDSCH codeword with precoding and power offset information |
| DCI format 2 | used for the scheduling PDSCH to UEs configured in closed-loop spatial multiplexing mode |
| DCI format 2A | used for the scheduling PDSCH to UEs configured in open-loop spatial multiplexing mode |

TABLE 13-continued

| DCI format | Description |
|---|---|
| DCI format 3 | used for the transmission of TPC commands for PUCCH and PUSCH with 2-bit power adjustments |
| DCI format 3A | used for the transmission of TPC commands for PUCCH and PUSCH with single bit power adjustment |

DCI formats and search spaces to be used may be differently determined depending on RNTI masked to CRC which has been used for generating DCI. Table 14 below represents DCI formats and search spaces of a control channel in case that SI-RNTI, P-RNTI or RA-RNTI is masked to the CRC of the DCI.

TABLE 14

| DCI format | Search space | Transmission mode of PDSCH corresponding to PDCCH |
|---|---|---|
| DCI format 1C | Common | If the number of PBCH transmit ports is one, single-antenna port, port 0 is used, otherwise Transmit diversity |
| DCI format 1A | Common | If the number of PBCH transmit ports is one, single-antenna port, port 0 is used, otherwise Transmit diversity |

Table 15 below shows DCI formats and search spaces of a control channel in case that SPS-C-RNT is masked to the CRC of the DCI

TABLE 15

| Transmission mode | DCI format | Search space | Transmission mode of PDSCH corresponding to PDCCH |
|---|---|---|---|
| Mode 1 | DCI format 1A | Common and UE specific | Single antenna port, port 0 |
| | DCI format 1 | UE specific | Single antenna port, port 0 |
| Mode 2 | DCI format 1A | Common and UE specific | Transmit diversity |
| | DCI format 1 | UE specific | Transmit diversity |
| Mode 3 | DCI format 1A | Common and UE specific | Transmit diversity |
| | DCI format 2A | UE specific | Transmit diversity |
| Mode 4 | DCI format 1A | Common and UE specific | Transmit diversity |
| | DCI format 2 | UE specific | Transmit diversity |
| Mode 5 | DCI format 1A | Common and UE specific | Transmit diversity |
| Mode 6 | DCI format 1A | Common and UE specific | Transmit diversity |
| Mode 7 | DCI format 1A | Common and UE specific | Single antenna port 5 |
| | DCI format 1 | UE specific | Single antenna port 5 |
| Mode 8 | DCI format 1A | Common and UE specific | Single antenna port 7 |
| | DCI format 2B | UE specific | Single antenna port 7 or 8 |
| Mode 9 | DCI format 1A | Common and UE specific | Single antenna port 7 |
| | DCI format 2C | UE specific | Single antenna port 7 or 8 |
| Mode 10 | DCI format 1A | Common and UE specific | Single antenna port 7 |
| | DCI format 2D | UE specific | Single antenna port 7 or 8 |

Table 16 below shows search spaces and DCI formats used in case that temporary C-RNTI is masked to the CRC of the DCI.

TABLE 16

| DCI format | Search space | Transmission mode of PDSCH corresponding to PDCCH |
|---|---|---|
| DCI format 1A | Common and UE specific | If the number of PBCH transmit ports is one, single-antenna port, port 0 is used, otherwise Transmit diversity |
| DCI format 1 | Common and UE specific | If the number of PBCH transmit ports is one, single-antenna port, port 0 is used, otherwise Transmit diversity |

Figure 13:
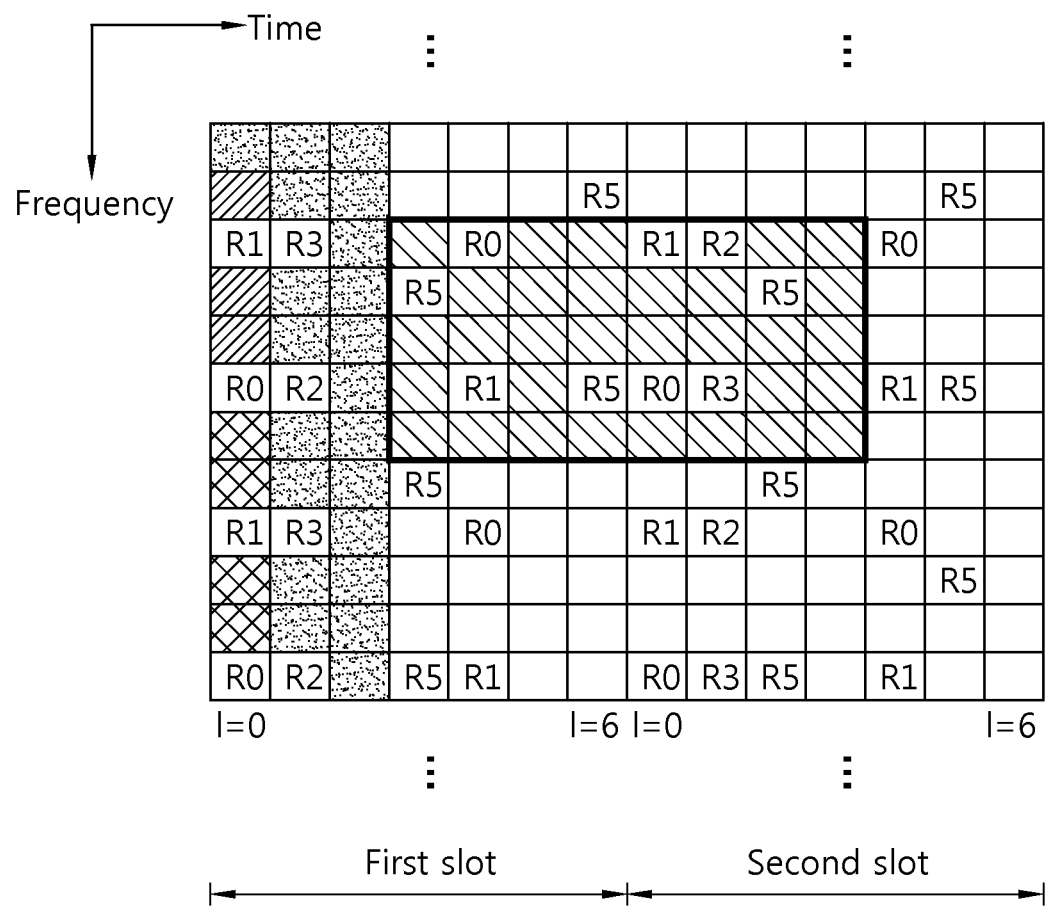
FIG. 13 is a view illustrating a downlink subframe allocated to a reference signal and a control channel in 3GPP LTE.

FIG. 13 shows an example of a downlink subframe in which a reference signal and a control channel in 3GPP LTE are allocated.

A downlink subframe may be classified into a control region and a data region. For example, in the downlink subframe, the control region (or a PDCCH region) includes front three OFDM symbols and the data region in which a PDSCH is transmitted includes remaining OFDM symbols.

In the control region, a PCFICH, a PHICH and/or the PDCCH are transmitted.

The physical HARQ ACK/NACK indicator channel (PHICH) may transmit a hybrid automatic retransmission request (HARQ) information as a response to a uplink transmission.

The physical control format indicator channel (PCFICH) may transmit the information of the number of OFDM symbols allocated to the PDCCH. For example, a control format indicator (CFI) of the PCFICH may indicate three OFDM symbols. The region excluding the resource through which the PCFICH and/or the PHICH is transmitted is the PDCCH region that a wireless device monitors the PDCCH.

In the subframe, various reference signals may be transmitted as well.

A cell-specific reference signal reference signal (CRS) is a reference signal that all wireless devices in a cell may receive, and may be transmitted over the whole downlink frequency band. In FIG. 6, 'R0' denotes an RE (resource element) where a CRS for a first antenna port is transmitted, 'R1' which is an RE where a CRS for a second antenna port is transmitted, 'R2' which is an RE where a CRS for a third antenna port is transmitted, and 'R3' which is an RE where a CRS for a fourth antenna port is transmitted.

The RS sequence $r_{l,n_s}(m)$ for CRS is defined as follows.

$$r_{l,n_s}(m) = \frac{1}{\sqrt{2}}(1 - 2 \cdot c(2m)) + j\frac{1}{\sqrt{2}}(1 - 2 \cdot c(2m+1)) \quad \text{(Equation 3)}$$

Herein, $m=0,1, \ldots, 2N_{RB}^{max,DL}-1$, $N_{RB}^{max,DL}$ is the maximum number of RBs, ns is a slot number in a radio frame, and l is an OFDM symbol index in a slot.

A pseudo-random sequence, c(i), is defined by a gold sequence whose length is 31, as follows.

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{<Equation 4>}$$

Herein, Nc=1600, and the first m-sequence is initialized as $x1(0)=1, x1(n)=0, n=1,2, \ldots 30$. The second m-sequence is initialized as $c_{init}=2^{10} \cdot (7 \cdot (n_s+1)+l+1) \cdot (2 \cdot N_{ID}^{cell}+1)+2 \cdot N_{ID}^{cell}+N_{CP}$ at the beginning of each OFDM symbol. $N_{ID}^{cell}$ is a physical cell identity (PCI) of the cell, and $N_{CP}=1$ in case of the normal CP, and $N_{CP}=0$ in case of the extended CP.

Also, aUE-specific reference signal (URS) may be transmitted in a subframe. Although the CRS is transmitted in the entire region of a subframe, the URS is transmitted in the data region of the sub-frame, and is a reference signal used for demodulating the PDSCH. In FIG. 7, 'R5' denotes an RE where the URS is transmitted. A DM-RS is a reference signal used for demodulating the EPDCCH data.

The URS may be transmitted in an RB in which the corresponding PDSCH data is mapped. Although in FIG. 7, R5 is denoted outside the area in which the PDSCH is transmitted, this is merely to indicate the position of the RE to which the URS is mapped.

The URS is may be a reference signal which is demodulated only by a specific wireless device. The RS sequence $r_{l,n_s}(m)$ for the URS is the same as Equation 3. At this time, $m=0,1,\ldots,12N_{RB}^{PDSCH}-1$ and $N_{RB}^{PDSCH}$ is the number of RBs which is used for the corresponding PDSCH transmission. In case that the URS is transmitted through a single antenna, the pseudo-random sequence generator is initialized as $c_{init}=(\lfloor n_s/2 \rfloor +1)\cdot(2N_{ID}^{cell}+1)\cdot 2^{16}+n_{RNTI}$ at the start of each subframe. $n_{RNTI}$ is an identifier of a wireless device.

The above-described initializing method is associated with the case where the URS is transmitted through a single antenna. When the URS is transmitted through a multi-antenna, the pseudo-random sequence generator is initialized as $c_{init}=(\lfloor n_s/2 \rfloor +1)\cdot(2N_{ID}^{(n_{SCID})}+1)\cdot 2^{16}+n_{SCID}$ at the start of each sub-frame. $n_{SCID}$ is a parameter that is acquired from a DL grant (for example, DCI format 2B or 2C) related with PDSCH transmission.

The URS supports multiple input multiple output (MIMO) transmission. Depending on an antenna port or layer, the RS sequence for the URS may be spread to the spread sequence as follows.

TABLE 7

| Layer | [w(0), w(1), w(2), w(3)] |
|---|---|
| 1 | [+1 +1 +1 +1] |
| 2 | [+1 −1 +1 −1] |
| 3 | [+1 +1 +1 +1] |
| 4 | [+1 −1 +1 −1] |
| 5 | [+1 +1 −1 −1] |
| 6 | [−1 −1 +1 +1] |
| 7 | [+1 −1 −1+ 1] |
| 8 | [−1 +1 +1 −1] |

A layer may be defined as an information path inputted to a pre coder. A rank is the number of non-zero eigenvalue in the MIMO channel matrix, and is the same as the number of layer or space stream. The layer may correspond to an antenna port that distinguishes the URS and/or a spread sequence which is applied to the URS.

Meanwhile, the PDCCH is monitored in a restricted region such as a control region in a subframe, and the CRS transmitted from whole bands is used for demodulating the PDCCH. As the sort of control data becomes diverse and an amount of the control data is increased, a flexibility of scheduling becomes deteriorated with the existing PDCCH only. Also, in order to decrease overhead owing to the CRS transmission, an enhanced PDCCH (EPDCCH) is introduced.

Figure 14:
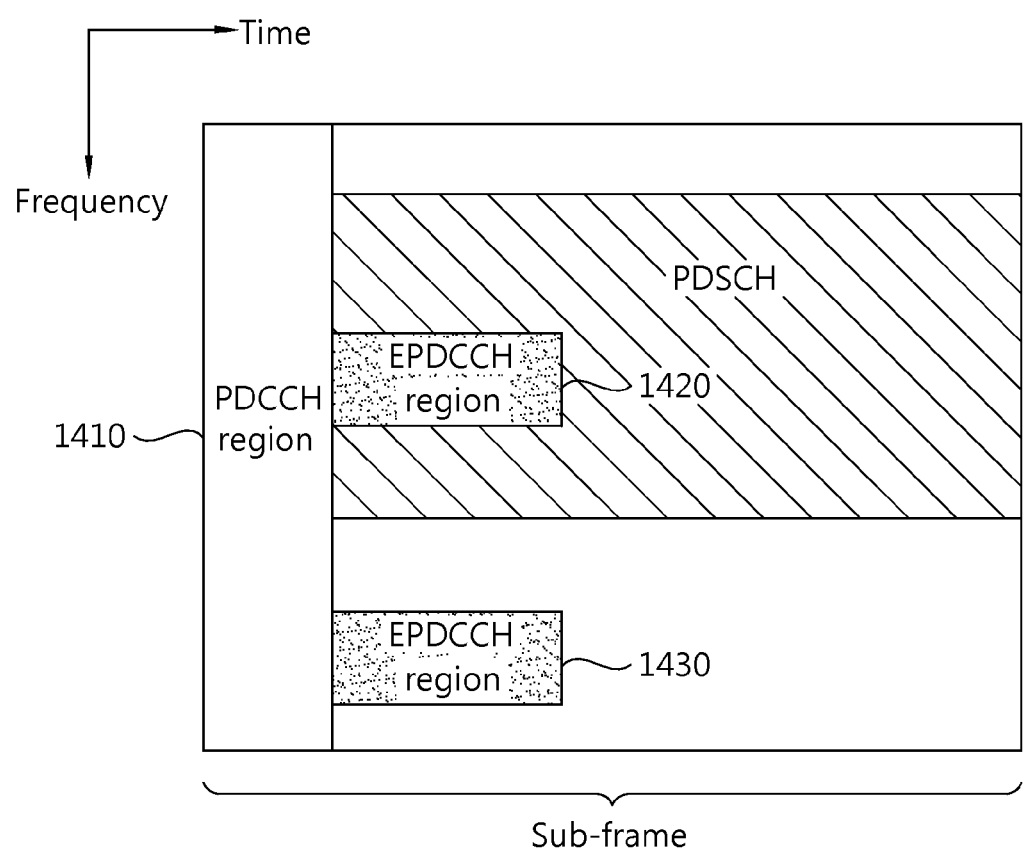
FIG. 14 is a view illustrating an exemplary subframe with EPDCCH.

FIG. 14 is a view illustrating an exemplary subframe with EPDCCH.

The subframe may include 0 or 1 PDCCH region 1410 and 0 or more EPDCCH regions 1420 and 1430.

The EPDCCH regions 1420 and 1430 are regions where a UE monitors EPDCCH. The PDCCH region 1410 is located in preceding 3 or up to 4 OFDM symbols of a subframe, and The EPDCCH regions 1420 and 1430 may be flexibly scheduled in the OFDM symbols, following the PDCCH region 1410.

One or more EPDCCH regions 1420 and 1430 may be assigned to the UE. The UE may monitor EPDCCH data in the EPDCCH regions 1420 and 1430 assigned to the UE.

A base station may notify the UE of information on a subframe for monitoring the EPDCCH and/or the number/position/size of the EPDCCH regions 1420 and 1430 through a radio resource control (RRC) message, and the like.

In the PDCCH region 1410, the PDCCH can be demodulated based on CRS. In the EPDCCH regions 1420 and 1430, DM-RS may be defined rather than CRS for demodulation. The DM-RS may be transmitted in the corresponding EPDCCH regions 1420 and 1430.

A RS sequence for the DM-RS is expressed in Equation 3. Here, $m=0,1,\ldots,12N_{RB}^{max,DL}-1$ and is the maximum number of RBs. A pseudo-random sequence generator can be initialized as $c_{init}=(\lfloor n_s/2 \rfloor +1)\cdot(2n_{ID,i}^{EPDCCH}+1)\cdot 2^{16}+n_{SCID}^{EPDCCH}$ at the start of each subframe. ns is the number of a slot in a radio frame, $n_{ID,i}^{EPDCCH}$ is a cell index related to the corresponding EPDCCH region, and $n_{SCID}^{EPDCCH}$ is a parameter given from higher-layer signaling.

Each of the EPDCCH regions 1420 and 1430 may be used in scheduling for different cells. For example, EPDCCH within the EPCCH region 1420 can deliver information on scheduling for a primary cell, and EPDCCH within the EPCCH region 1430 can send information on scheduling for a secondary cell.

When the EPDCCH is transmitted via multiple antenna in the EPDCCH regions 1420 and 1430, the same precoding as that of the EPDCCH may be applied to DM-RS in EPDCCH regions 920 and 930.

Considering that the PDCCH uses CCE as a transmission resource unit, a transmission resource unit for the EPDCCH is referred to as Enhanced Control Channel Element (ECCE), An aggregation level may be defined as a resource unit for monitoring the EPDCCH. For example, assuming that 1 ECCE is a minimum resource for the EPDCCH, an aggregation level may be L={1, 2, 4, 8, 16}. A search space may be defined even in the EPDCCH region. The UE can monitor EPDCCH candidates on the basis of the aggregation level.

Figure 15:
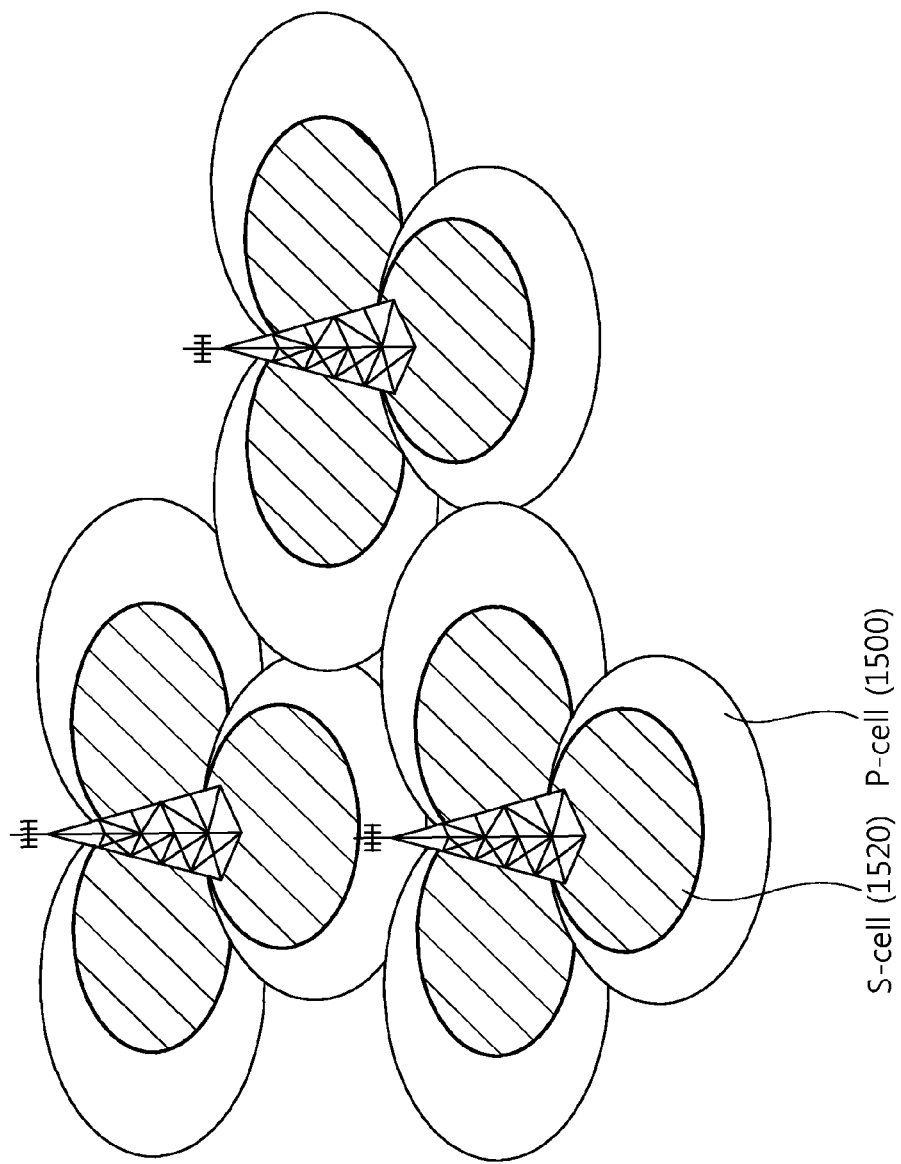
FIG. 15 is a concept view illustrating a P-cell and an S-cell.

FIG. 15 is a concept view illustrating a P-cell and an S-cell.

Referring to FIG. 15, a base station can perform carrier aggregation based on PCC of the P-cell 1500 and one or more SCC of the S-cell 1520. When 2 cells or more exist, the base station can determine one cell as the P-cell 1500 and determine another cell as S-cell 1520. The base station may transmit data to a UE by using aggregated frequency bandwidth, after aggregating CC of the determined P-cell 1500 and S-cell 1520. The UE also can transmit data to the base station by using aggregated frequency bandwidth. The P-cell 1500 and S-cell 1520 of FIG. 15 is an example of a scenario where the P-cell 1500 and S-cell 1520 are arranged, where a transmission range of data on the basis of PCC is greater than that of data on the basis of SCC.

The UE can perform radio resource control (RRC) connection through the PCC. Furthermore, the UE can attempt random access to the base station through a physical random access channel (PRACH) based on a signal which is signaled through the PCC. That is, the UE can perform initial connection establishment or connection re-establishment process to the base station through the PCC in carrier aggregation environment.

The SCC of the S-cell 1520 may be used for providing additional radio resources. In order to perform carrier aggregation by which SCC is aggregated to PCC, the UE needs to perform neighbor cell measurement for acquiring information on the neighbor cells. The base station can determine whether to aggregate the SCC to the PCC according to the result of the neighbor cell measurement. For example, in the P-cell, a NCT subframe to be described may be transmitted via the SCC. A legacy subframe may be used for identifying a subframe format as defined in the previous 3GPP LTE-A release from the NCT subframe as newly defined in the 3GPP LTE-A release.

The base station can transmit PDCCH data through the PCC to the UE. The PDCCH data may include information on allocation of PDSCH data to be transmitted via a downlink PCC bandwidth and SCC bandwidth, and information on approval of data transmission via an uplink.

The P-cell 1500 and the S-cell 1520 may perform carrier aggregation through configuration and activation and transmit and receive data through an aggregated frequency bandwidth.

When performing A/N transmission via an existing uplink, the following problems may occur.

First, uplink resources may be insufficient due to inter cell interference coordination (ICIC) configuration over an uplink. In this case, a small cell may be arranged, and inter cell interference coordination may be performed in a time division multiplexing (TDM) manner. In this case, each base station may preselect a blank uplink subframe in which other UEs did not schedule uplink transmission so that a UE served by the base station performs scheduling on the subframe. In order to improve ICIC performance, the blank uplink subframe may be shared by the plurality of base stations. If a UE-specific PUCCH is not scheduled to the configured blank uplink subframe, uplink resources for transmitting the PUCCH for A(ACK)/N(NACK) transmission may not be available due to the blank uplink configuration. To solve such problems, it is necessary to reconfigure A/N timing according to the blank uplink configuration.

In addition, when inter-site carrier aggregation is performed, latency may occur in the A/N procedure. In intra base station carrier aggregation, in case a base station, which has performed carrier aggregation, exists at one site, latency between base stations may be relatively less in performing the A/N procedure. However, in intra base station carrier aggregation (or inter site carrier aggregation) in case a base station, which has performed carrier aggregation, exists at multiple sites, latency between base stations may be greater in performing the A/N procedure. In this case, the A/N procedure may not be effective due to high delay between the base stations performing carrier aggregation. Suppose that inter site carrier aggregation is performed between a macro cell (P-cell) and a small cell (S-cell) both of which are located at different sites, and two base stations communicate with each other based on X2 interface. In this case, delay between two base stations may be up to dozens of msec. If in carrier aggregation, the A/N procedure is being performed between sites, A/N of the small cell may be transmitted to the P-cell, and the S-cell may receive a response for the A/N through an X2 interface. If X2 latency is significant, it is impossible to normally perform the A/N procedure. Therefore, the S-cell A/N needs to be directly transmitted so that the UE receives a response for the A/N.

If in intra base station CA (intra site CA), change in the S-cell occurs frequently, it may not be effective to transmit and receive the A/N on the basis of an existing A/N procedure. For example, assume that a macro cell (P-cell) includes a plurality of RRHs(S-cell), and a UE frequently moves from one remote radio head(RRH) to another RRH. In this case, handling A/N of an S-cell on the basis of a P-cell may not be effective. In particular, when the entire configured S-cells require A/N of PUCCH format 3 so that the PUCCH format 3 is used with A/N PUCCH, an A/N procedure may not be more effective based on the P-cell. In this case, if the S-cell configured to the UE increases in number, this may be more inefficient A/N procedure.

When a UE moves frequently to switch S-cells, this may complicate an A/N procedure. In addition, if A/N of the S-cell is transmitted after being aggregated with A/N of other S-cells, ambiguity of an A/N procedure may increase. Hereinafter, an A/N procedure according to an embodiment of the present invention may be adopted in the case that carrier aggregation is performed between multiple cells, and that transmitting A/N based on a P-cell is not effective.

To solve the aforementioned problem, according to an embodiment of the present invention, the following methods may be considered as an A/N transmission method to perform an A/N procedure for a cell which has performed carrier aggregation.

Figure 16:
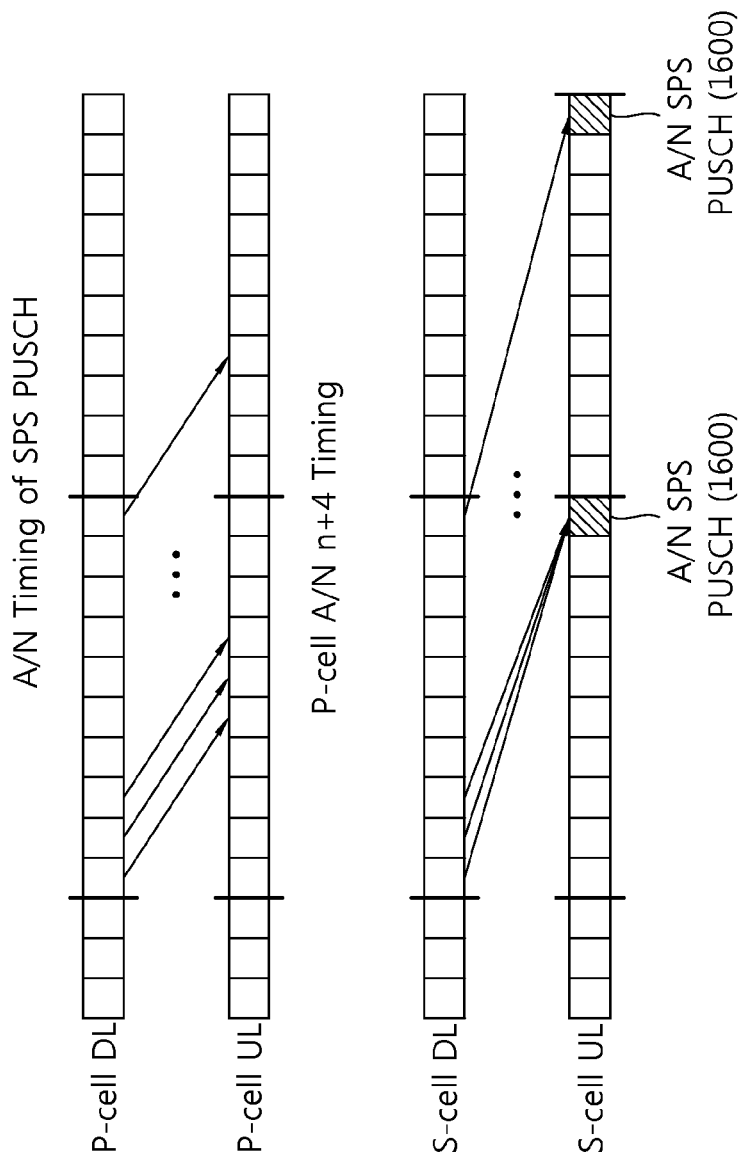
FIG. 16 is a concept view illustrating a method of transmitting on A/N SPS PUSCH according to an embodiment of the present invention.

1) Method for transmitting each A/N for an S-cell (or P-cell) through PUSCH as a SIM-linked uplink 2) Method for transmitting A/N aggregated for the entire cells configured to change A/N transmission timing through PUSCH of an S-cell or P-cell 3) Method for transmitting individual A/N of cells configured to change A/N transmission timing through PUSCH of an S-cell or P-cell FIG. 16 is a concept view illustrating a method of transmitting on A/N SPS PUSCH according to an embodiment of the present invention.

Referring to FIG. 16, according to an embodiment of the present invention, a UE can transmit A/N for an S-cell and A/N for a P-cell to the P-cell and the S-cell respectively. That is, the UE can A/N for the P-cell to the P-cell over a SIB-linked uplink channel. Further, the UE can transmit A/N for the S-cell to the S-cell over an S-cell SIB-linked uplink channel In the P-cell, A/N for downlink data received through the UE through $n^{th}$ subframe may be transmitted through $(n+4)^{th}$ subframe.

The S-cell can transmit a response for data received through at least one downlink subframe via A/N SPS PUSCH 1600 as a configured uplink channel. For example, the A/N SPS PUSCH 1600 in $n^{th}$ subframe may be a higher-layer channel for transmitting A/N for downlink data received through $(n+4)^{th}$ downlink subframe. In FDD, k may be equal to or greater than 4, and equal to or less than SPS_interval+4−1. SPS-interval may be the interval at which the A/N SPS PUSCH 1600 is transmitted. For example, if the SPS_interval is 10, it is possible to transmit A/N for the downlink subframe transmitted before $4^{th}$ subframe to $13^{th}$ subframe on the basis of a subframe to which the A/N SPS PUSCH 1600 is allocated.

In TDD, the A/N SPS PUSCH may be configured to one uplink subframe according to configuration of an uplink subframe and a downlink subframe in a radio frame. A UE can transmit A/N of $(n-k)^{th}$ downlink subframe through the uplink subframe to which the A/N SPS PUSCH is configured. k of $(n-k)^{th}$ downlink subframe may be differently defined according to configuration of an uplink subframe and a downlink subframe of a radio frame in TDD. An embodiment of the present invention may be also applied to EPDCCH. In addition, the UE can transmit A/N over A/N SPS PUCCH as an uplink control channel as well as A/N SPS PUSCH as an uplink data channel. A scheme for transmitting uplink control data via the A/N SPS PUSCH is also called a piggyback transmission scheme. The piggyback transmission indicates a transmission scheme for multiplexing uplink control information (UCI) in a PUSCH region. For example, the UE does not transmit the UCI in the PUCCH region of subframe n, but transmits the UCI by multiplexing the UCI with uplink data in the PUSCH region. Such a transmission scheme of uplink control information is referred to as piggyback.

Hereinafter, an embodiment of the present invention provides a method for transmitting an A/N signal for each S-cell over A/N SPS PUSCH and/or A/N SPS PUCCH when a plurality of CCs are aggregated. When the plurality of CCs are aggregated, one or more A/N SPS PUSCH and/or A/N SPS PUCCH may be configured for each UE.

As an example, A/N SPS PUSCH and/or A/N SPS PUCCH for each CC or each TAG may be defined to transmit the A/N signal. As another example, a plurality of CC groups may be configured, and A/N SPS PUSCH and/or A/N SPS PUCCH for each group may be defined to transmit the A/N signal. The individually defined A/N SPS PUSCH and/or A/N SPS PUCCH may be individually handled as a unit to each CC, each TAG or each CC group. For example, A/Ns for the plurality of CCs or each CC in each TAG may be configured to be aggregated to be transmitted over the SPS PUCCH/PUSCH.

As another example, a UE may transmit A/N to a base station through the A/N SPS PUSCH for a P-cell. All of the A/Ns for CCs are aggregated and transmitted to a P-cell over the A/N SPS PUCCH/PUSCH.

As yet another example, a UE may transmit A/N through the A/N SPS PUCCH/PUSCH for a P-cell, and transmit A/N through the one or more A/N SPS PUCCH/PUSCHs for one or more S-cells.

One A/N SPS PUCCH/PUSCH may cover A/N for one S-cell or A/N for a plurality of S-cells according to configuration. The S-cell for transmitting A/N through the A/N SPS PUCCH/PUSCH for the S-cell can be specified. A/N for the S-cell, which is not allocated to the A/N SPS PUCCH/PUSCH for the S-cell may be transmitted via the P-cell A/N SPS PUCCH/PUSCH.

Figure 17:
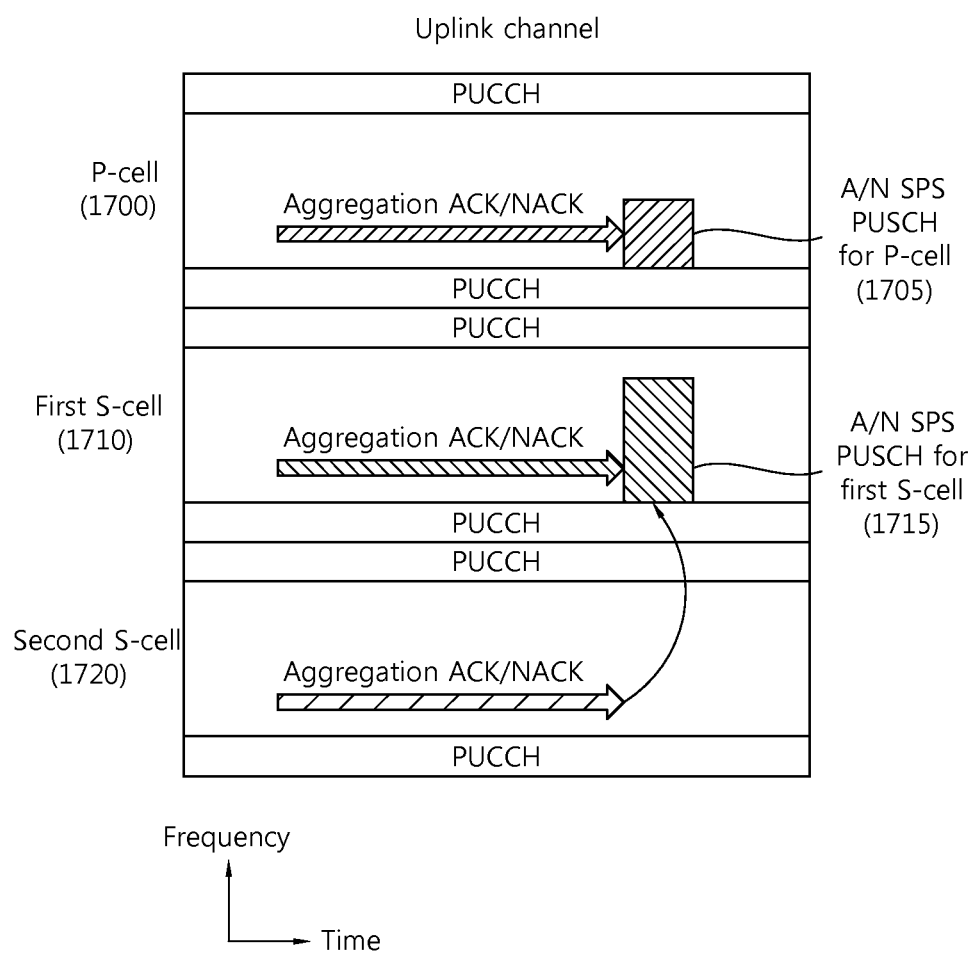
FIG. 17 is a concept view illustrating a method of transmitting A/N through A/N SPS PUCCH/PUSCH according to an embodiment of the present invention.

FIG. 17 is a concept view illustrating a method of transmitting A/N through A/N SPS PUCCH/PUSCH according to an embodiment of the present invention.

Referring to FIG. 17, assume that in a P-cell 1700 and two S-cells 1710 and 1720, carrier aggregation are performed, A/N SPS PUSCH 1705 for the P-cell 1700 is defined, and A/N SPS PUCCH/PUSCH 1715 for a first S-cell 1710 is defined. In this case, A/Ns for uplink data transmitted to the P-cell may be aggregated and be transmitted through A/N SPS PUSCH 1705. In case the first S-cell 1710 covers A/N for the first S-cell 1710 and A/N for the second S-cell 1720, A/N for the first S-cell 1710 and A/N for the second S-cell 1720 may be transmitted over the A/N SPS PUSCH 1715 for the first S-cell 1710. That is, A/N for the P-cell 1700 and A/N for the S-cells 1710 and 1720 may be individually transmitted. In at least one of the P-cell and S-cell, A/N transmission may be performed via A/N SPS PUCCH. For example, only in the S-cell among the P-cell and the S-cell, A/N transmission is possible through A/N SPS PUA/N SPS PUSCH or A/N SPS PUCCH. In the P-cell, a channel is allocated according to a legacy HARQ procedure so as to transmit an A/N signal.

If a third S-cell is configured, and the first A/N SPS PUCCH/PUSCH 1715 for the first S-cell is impossible to cover A/N of the third S-cell, the A/N of the third S-cell may be transmitted via the A/N SPS PUCCH/PUSCH 1705 for the P-cell.

That is, the UE may allocate A/N SPS PUSCH for transmitting A/N with regard to downlink transmission of the primary (P)-cell. Further, A/N SPS PUSCH for transmitting A/Ns with regard to downlink transmission of the first and the second cells may be allocated to the UE. The UE may transmit A/N over the A/N SPS PUSCH for transmitting A/Ns with regard to downlink transmission of the primary (P)-cell and the second S-cell.

In case that A/N SPS PUSCH for transmitting A/N for downlink transmission of the primary (P)-cell may be a channel allocated to $n^{th}$ uplink subframe of the P-cell, the A/N is for $(n-k)^{th}$ downlink subframe of the P-cell, and the k may be equal to or less than A/N SPS PUSCH transmit interval+4−1. The transmit interval of the A/N SPS PUSCH may be information on the time interval of A/N SPS PUSCH transmission.

Likewise, A/N SPS PUSCH for transmitting A/N with regard to downlink transmission of the first and the second S-cells may be a channel assigned to $n^{th}$ uplink subframe of one S-cell. k may be equal to or less than A/N SPS PUSCH transmit interval+4−1. The transmit interval of the A/N SPS PUSCH may be information on the time interval of A/N SPS PUSCH transmission.

A/Ns for the first and the second S-cells are aggregated to be transmitted through one A/N SPS PUCCH/PUSCH. A cell for aggregating A/Ns to transmit through one A/N SPS PUCCH/PUSCH is referred to as a target cell. A cell for receiving A/Ns aggregated after A/N SPS PUCCH/PUSCH is defined like the first S-cell is called an uplink cell. Further details about this will be described.

As another example, A/N SPS PUCCH/PUSCH may be defined for one s-cell. After A/Ns for the entire CCs are aggregated, a UE may transmit the aggregated A/N over S-cell SPS PUCCH/PUSCH.

As yet another example, one or more A/N SPS PUCCH/PUSCH may be configured. A/Ns for each CC may be transmitted through one A/N SPS PUCCH/PUSCH. The A/N SPS PUCCH/PUSCH may be configured to a P-cell and/or an S-cell.

According to an embodiment of the present invention, SPS PUSCH and A/N SPS PUSCH for transmitting traffic data may be differentially configured in configuring A/N SPS PUSCH.

For example, SPS configuration for A/N PUSCH SPS may be newly defined. The SPS configuration for the A/N SPS PUSCH may be newly defined, unlike SPS PUSCH configuration.

Figure 18:
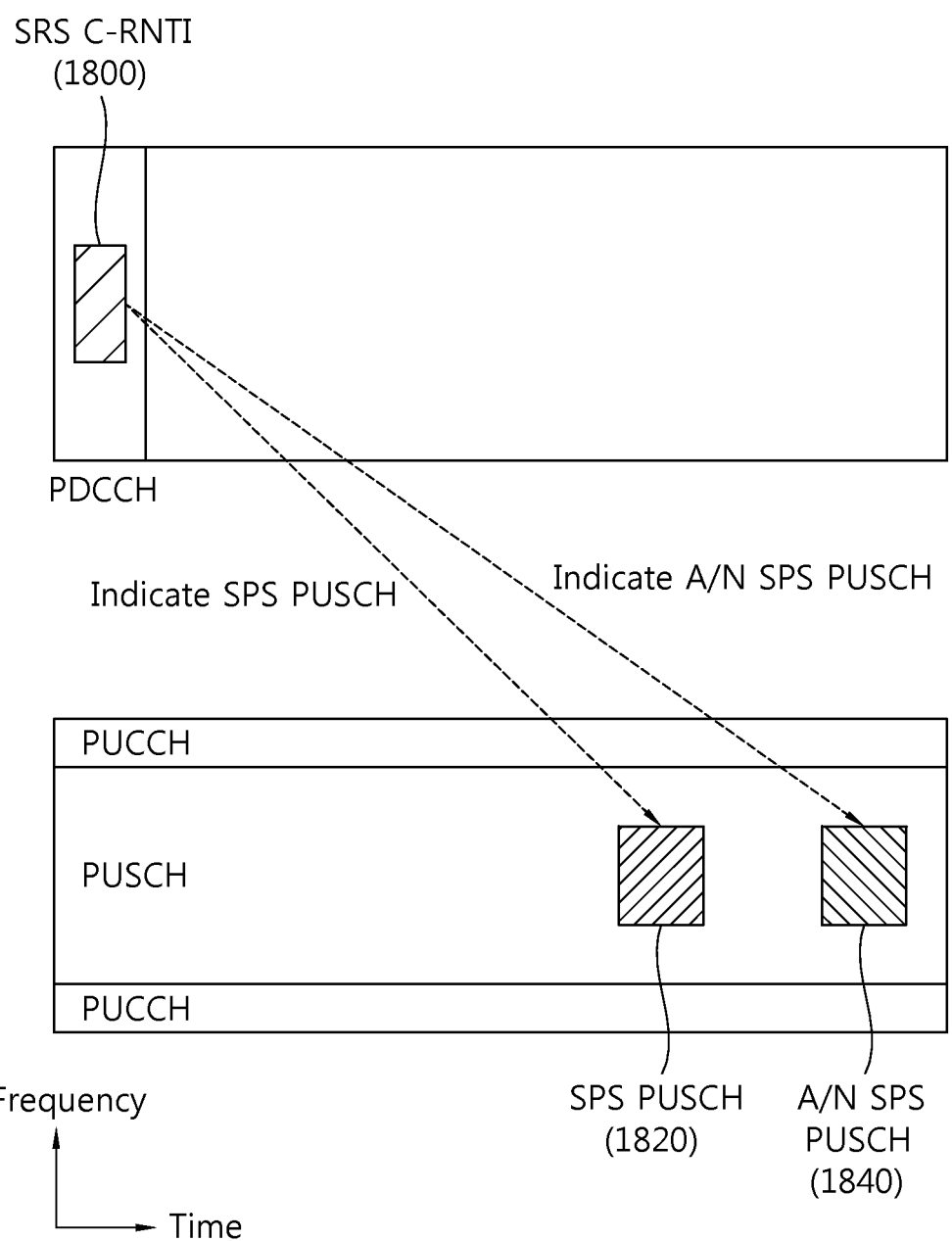
FIG. 18 is a concept view illustrating a method of identifying SPS PUSCH SPS and A/N SPS PUSCH according to an embodiment of the present invention.

FIG. 18 is a concept view illustrating a method of identifying SPS PUSCH SPS and A/N SPS PUSCH according to an embodiment of the present invention.

Referring to FIG. 18, a value of SPS-C-RNTI 1800 may be set by dividing SPS PUSCH 1820 and A/N PUSCH SPS 1840. A set of the SPS-C-RNTI 1800 indicating A/N SPS PUSCH 1840 may be specified in advance. A UE can determine whether SPS configuration is for A/N SPS PUSCH 1840 or SPS PUSCH 1820 for data on the basis of the SPS-C-RNTI 1800.

A/N PUSCH SPS 1840 and SPS PUSCH 1820 can be identified on the basis of numberOfConfSPS-Processes included in a SPS configuration field. The numberOfConfSPS-Processes may denote the number of HARQ processes configured for SPS PUSCH. If the numberOfConfSPS-Processes is set to 0, the number of the HARQ processes for the SPS PUSCH 1820 may be indicated as 0. Accordingly, A/N SPS PUSCH can be denoted by setting the numberOfConfSPS-Processes to 0.

In addition, according to an embodiment of the present invention, it is possible to configure A/N SPS PUSCH by setting SPS PUSCH interval. Currently permissible values of the SPS PUSCH interval may be 10 msec, 20 msec, 32 msec, 40 msec, 64 msec, 80 msec, 128 msec, 160 msec, 320 msec, and 640 msec. In an existing SPS configuration, a SPS interval field includes preserved six values. The interval for the A/N SPS PUSCH may be set on the basis of the preserved values of the interval field. For the interval at which A/N SPS PUSCH is transmitted, for example, the A/N SPS PUSCH may be delivered in addition to interval combination as follows. The intervals at which the A/N SPS PUSCH is transmitted may be mapped to the preserved six values.

1) A multiple for 4 msec can be set for each A/N SPS PUSCH interval. For, example, 4 msec and/or 8 msec for each A/N SPS PUSCH interval can be provided.

2) A multiple for HARQ timing can be set for each A/N SPS PUSCH interval. In FDD, a multiple for 8 msec can be set for each A/N SPS PUSCH interval. In addition, In TDD, according to downlink/uplink configuration, a maximum timing value can be determined according to DL/UL subframe configuration on the basis of radio frame configuration.

3) A multiple for 5 msec can be set for each A/N SPS PUSCH interval. For, example, 5 msec and/or 15 msec for each A/N SPS PUSCH interval can be provided.

4) A multiple for 16 msec can be set for each A/N SPS PUSCH interval. For, example, 16 msec for each A/N SPS PUSCH interval can be provided.

If additional A/N SPS PUSCH interval values are mapped to preserved six values, a UE can select one of 16 intervals. A base station can set an interval semi-statically for UE A/N SPS PUSCH. By adding RRC configuration which is transmitted from the base station to the UE, SPS validation or SPS revalidation can be used in order to change A/N SPS PUSCH intervals which are transmitted by the UE.

Figure 19:
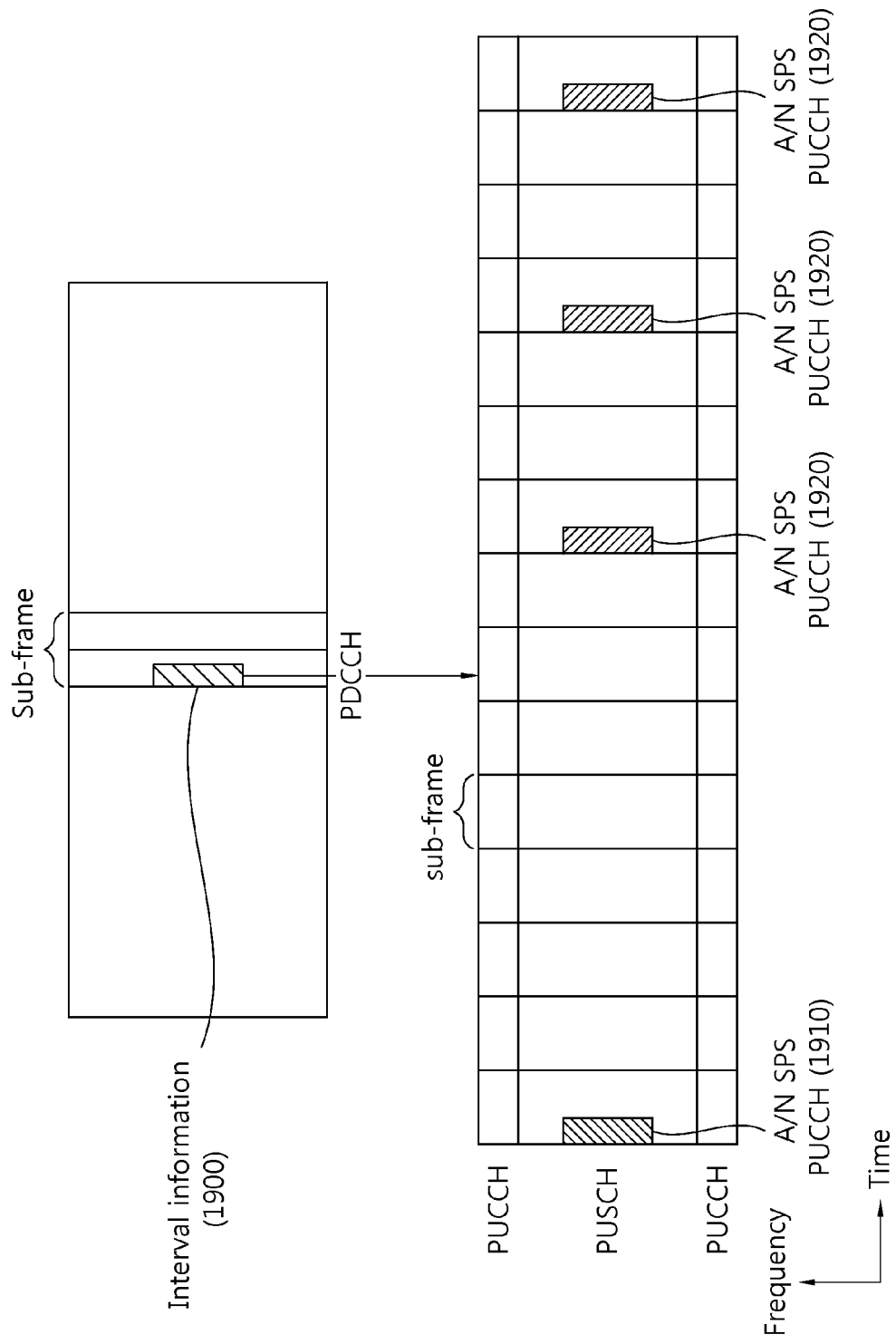
FIG. 19 is a concept view illustrating change in an interval of A/N SPS PUSCH.

FIG. 19 is a concept view illustrating change in an interval of A/N SPS PUSCH.

Referring to FIG. 19, PDCCH can be validated by adding a new field including interval information 1900 so that an interval of A/N SPS PUSCH can be reconfigured.

For example, a UE may transmit A/N through A/N SPS PUSCH 1910 having 8 msec cycle before the interval information is reconfigured. The UE can change the interval of the A/N SPS PUSCH on the basis of interval information transmitted via PDCCH. For example, the interval information may be indexed so as to transmit A/N SPS PUSCH 1920 having period of 4 msec. In this case, the UE can transmit A/N through the A/N SPS PUSCH 1920 configured to have period of 4 msec.

In addition, with a method of setting a value specific to an existing PDDCH field, the A/N SPS PUSCH interval may be reconfigured. For example, remaining 4-bits in MCS with PDCCH DCI format 0 for PDCCH validation may be used for interval information of the A/N SPS PUSCH.

If it is necessary to change the interval of the A/N SPS PUSCH, a PDCCH validation message including other reset interval values may be transmitted to change interval values. Combination of fields included in a DCI format, which is used for uplink approval allocation for A/N SPS, may be used to indicate intervals of A/N SPS PUSCH. For example, information on the interval of the A/N SPS PUSCH may be acquired based on a MCS field or a NDI field or a CSI field included the DCI format.

In addition, according to an embodiment of the present invention, A/N PUSCH SPS may be transmitted by configuring a cell. For example, for A/N SPS PUSCH configuration, a UE can configure an uplink cell and a target cell. The uplink cell may be a cell which receives A/Ns aggregated from the UE. The target cell is a cell in which carrier aggregation is performed, and A/N bits for the target cell are aggregated and transmitted to an uplink channel through A/N SPS PUSCH.

Figure 20:
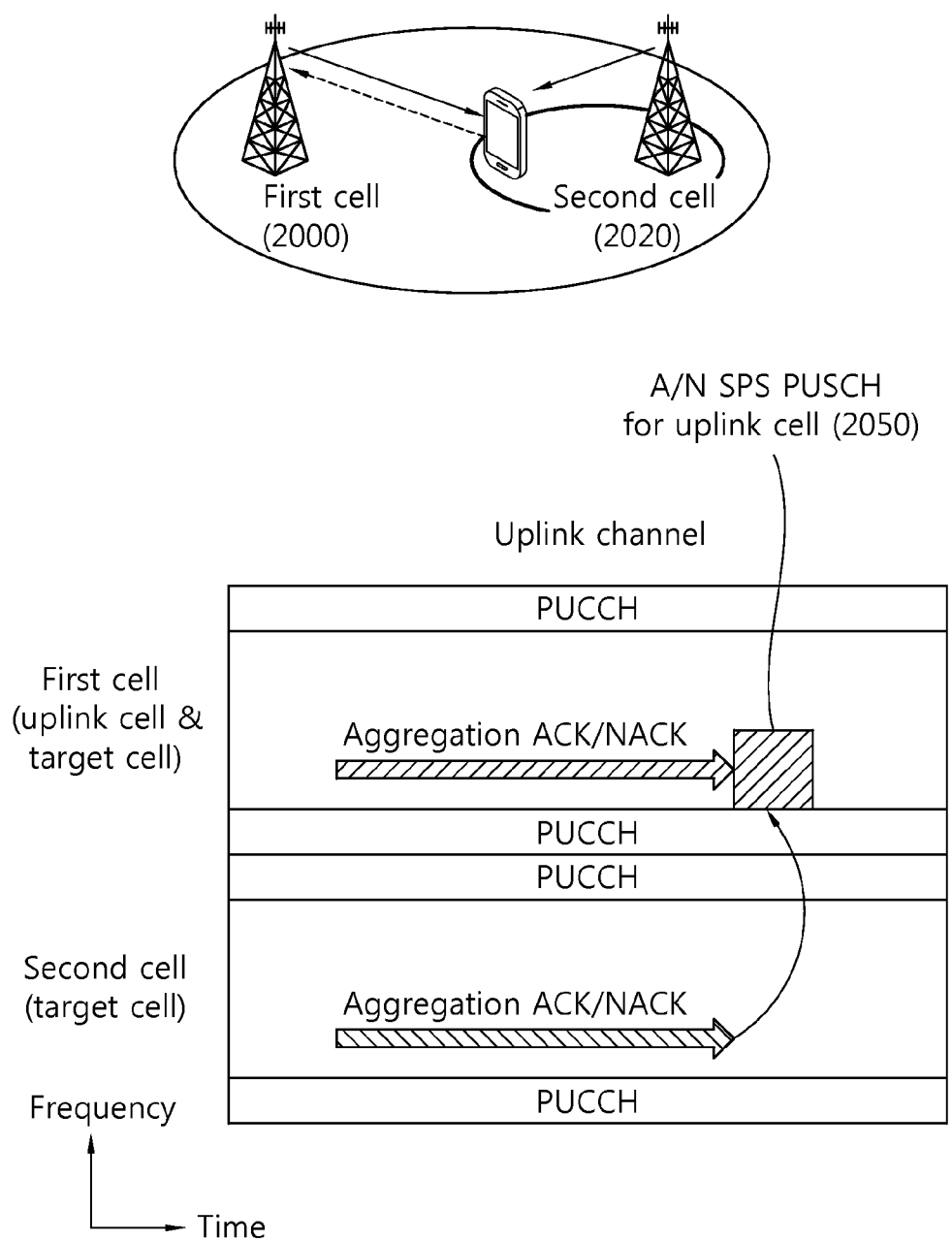
FIG. 20 is a concept view illustrating A/N SPS PUSCH transmission through cell configuration.

FIG. 20 is a concept view illustrating A/N SPS PUSCH transmission through cell configuration.

In FIG. 20, a method is provided that in two cells, after receiving downlink data, a UE transmits uplink data through configured one uplink cell.

For example, if the uplink cell is a first S-cell 2000, and a target cell is the first S-cell 2000 and a second S-cell 2020, an aggregated cell of the first S-cell 2000 and the second S-cell 2020 may be transmitted through A/N SPS PUSCH 2050 for the first S-cell 2000. A new field may be defined in SPS configuration in order to configure the uplink cell and the target cell. For example, the new field may include information on PUSCH_Cell and the target cell. A cell to be used may be indicated as the uplink cell and the target cell may be indicated through an indicator such as a bitmap on the basis of the new field. For example, in the bitmap, one bit may indicate one CC index. If one bit is set to 1, A/Ns for the indicated cell are aggregated to be transmitted through the uplink cell (PUSCH_Cell). In addition, the uplink cell and the target cell may be indicated by using an existing field. For example, the uplink cell (PUSCH_Cell) may be indicated on the basis of SPS validation and a first PDCCH for approving activated PDCCH CIF or uplink SPS A/N PUSCH. The target cell also may be reconfigured on the basis of SPS validation and activated PDCCH. In order to configure the target cell, a new field for a bitmap of the target cell may be used.

Hereinafter, in an embodiment of the present invention, if A/N SPS PUSCH/PUCCH is collided with another channel, a transmission method of each channel will be described. When SPS is configured through PDCCH validation in $n^{th}$ subframe and revalidated, A/N SPS PUSCH transmission may start at $(n+k)^{th}$ subframe. k indicates an interval size of the A/N SPS PUSCH/PUCCH.

Figure 21:
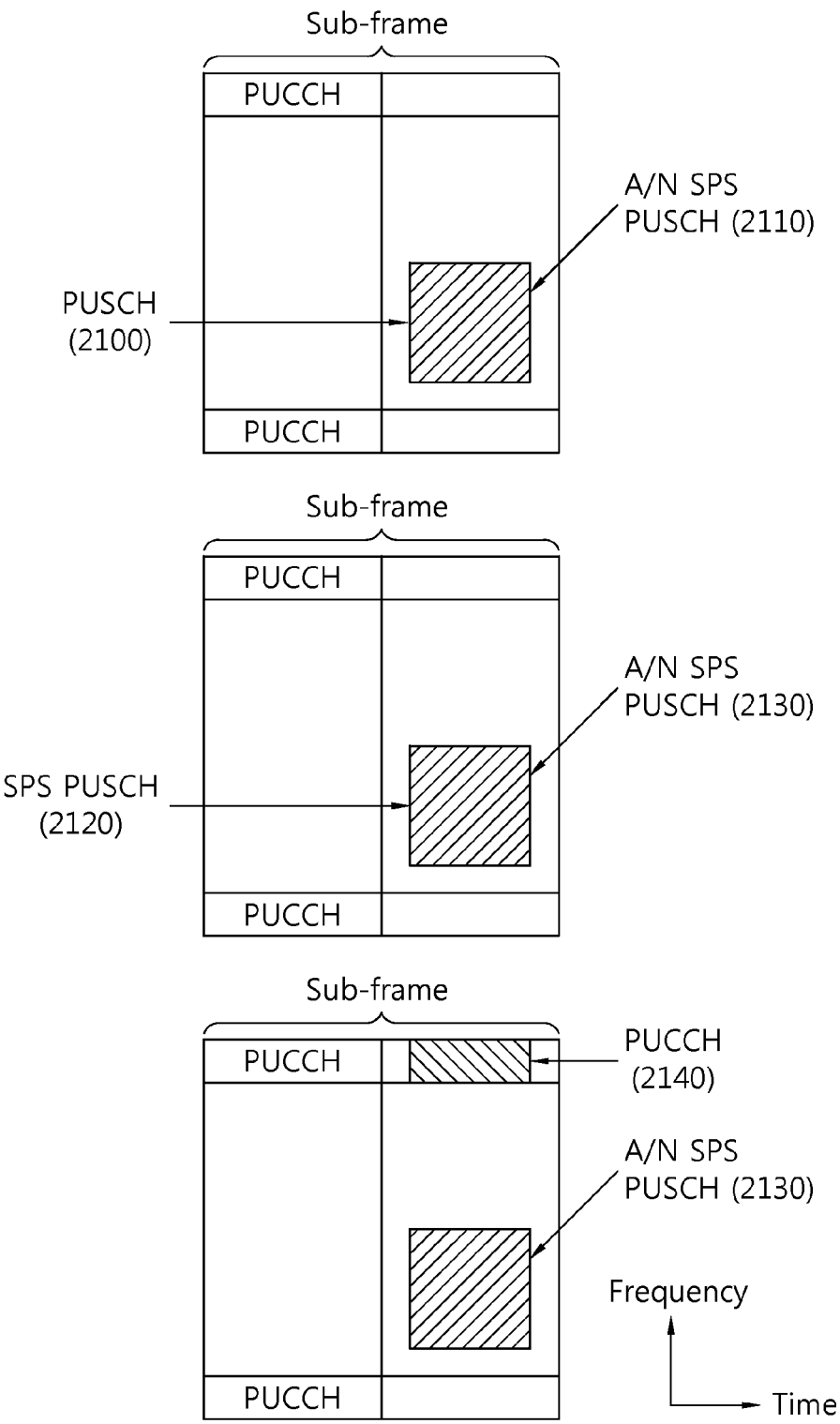
FIG. 21 is a view illustrating A/N SPS PUSCH/PUCCH transmission method in channel collision.

FIG. 21 is a view illustrating A/N SPS PUSCH/PUCCH transmission method in channel collision.

FIG. 21A shows a case in which A/N SPS PUSCH/PUCCH 2110 and PUSCH 2100 scheduled according to uplink approval are collided with each other.

In this case, a UE may piggyback A/N on PUSCH or delay or drop data PUSCH. For example, the UE may transmit data PUSCH after delaying one subframe or delaying until next uplink subframe for data PUSCH is available, or waiting for uplink approval. If two PUSCHs do not share identical uplink resources, data PUSCH 2100 and A/N SPS PUSCH 2110 may be transmitted by multiplexing.

FIG. 21B shows a case in which SPS PUSCH 2120 and A/N SPS PUSCH/PUCCH 2130 are collided with each other.

In the case in which SPS PUSCH 2120 and A/N SPS PUSCH/PUCCH 2130 are collided with each other, it is possible to perform operations similar to those in the case in which scheduled PUSCH and A/N SPS PUSCH/PUCCH are collided with each other. That is, A/N may be transmitted via the SPS PUSCH 2120, or the SPS PUSCH 2120 may be skipped. If two PUSCHs do not share identical uplink resources, the data PUSCH 2120 and the A/N SPS PUSCH 2130 may be transmitted by multiplexing FIG. 21C shows a case in which PUCCH 2140 and A/N SPS PUSCH/PUCCH 2150 are collided with each other.

In the case in which the A/N SPS PUSCH/PUCCH 2150 and the PUCCH 2140 are collided with each other, it is the considered that the A/N SPS PUSCH/PUCCH 2150 are scheduled in a P-cell or an S-cell for transmission on the PUCCH 2140, or that A/N SPS PUSCH/PUCCH 2150 is collided with PUCCH 2140 as in the case that SPS PUSCH 2150 for an S-cell is collided with PUCCH 2140 for another cell. If simultaneous PUCCH/PUSCH transmission is permissible, the A/N SPS PUSCH 2150 can be transmitted in parallel with the PUCCH 2140. If simultaneous PUCCH/PUSCH transmission is not permissible, the A/N SPS PUSCH 2150 may be delayed until one subframe or next uplink subframe is available, or may be skipped. If the A/N SPS PUSCH 2150 is skipped, all of the A/Ns, which have not been transmitted due to the skipped A/N PUSCH, are aggregated and transmitted.

In addition, PRACH and A/N SPS PUSCH/PUCCH may be collided with each other. In this case, the PRACH may have priority higher than that of PUSCH, and may dropped or skipped.

According to an embodiment of the present invention, A/N resources for A/N SPS PUSCH may be determined as follows. A/N for A/N SPS PUSCH may be positioned similarly to a case that A/N is piggybacked on PUSCH and a case that A/N is multiplexed with CSI. The number of A/Ns may be calculated as follows.

In FDD, the number of A/Ns may be calculated by the number of subframes between two A/N SPS PUSCH transmission (e.g., A/N PUSCH SPS interval), the number of transport blocks transmitted in each subframe, and a product. A FDD UE may not be aware of the total number of a transmitted downlink, and may transmit A/N for the entire downlink subframes. In other words, more specifically, the number of A/Ns may be min (the maximum number of HARQ (Max HARQ number), a valid downlink subframe (a downlink subframe of an A/N SPS PUSCH interval) "the number of transport blocks).

In TDD, the number of A/Ns may be calculated by min (the maximum number of HARQ (Max HARQ number), a valid downlink subframe (a downlink subframe of an A/N SPS PUSCH interval) "the number of transport blocks).

If the number of A/Ns is determined on the basis of the aforementioned method, allocation order of the A/Ns may be as follows.

If Max HARQ number is less than the number of a valid downlink subframe (ValidDownlinkSubframe), A/N indicated as a lowest HARQ index may be located in the first A/N allocation resource, and A/Ns indicated as other HARQ indices may be positioned in A/N allocation resources in ascending order.

If Max HARQ number is equal to or greater than the number of a valid downlink subframe (ValidDownlinkSubframe), a system frame number(SFN) index for a subframe may be used for A/N allocation order. A/N indicated as a lower HARQ index may be first allocated, and the other remaining A/Ns may be allocated for other SFNs by using lower HARQ indices.

According to an embodiment of the present invention, A/N may be transmitted through A/N SPS PUCCH as well as A/N SPS PUSCH. The A/N SPS PUCCH may be transmitted on the basis of a SPS schedule other than timing defined in the current LTE system, unlike PUCCH for transmitting an existing A/N. If the A/N SPS PUCCH is scheduled, when the number of valid downlink subframes corresponding to A/Ns is 1, A/N may be transmitted based on PUCCH format 1a/1b. If the number of valid downlink subframes is 2, A/N may be transmitted based on PUCCH format 2a/2b. Otherwise, A/N may be transmitted on the basis of PUCCH format 3. If A/N bits supported by PUCCH format 3 is more than 20 bits, A/N bundling may be performed so that information on A/N may be transmitted to a base station.

Hereinafter, in an embodiment of the present invention, a method of transmitting A/N through A/N SPS PUSCH will be described.

Figure 22:
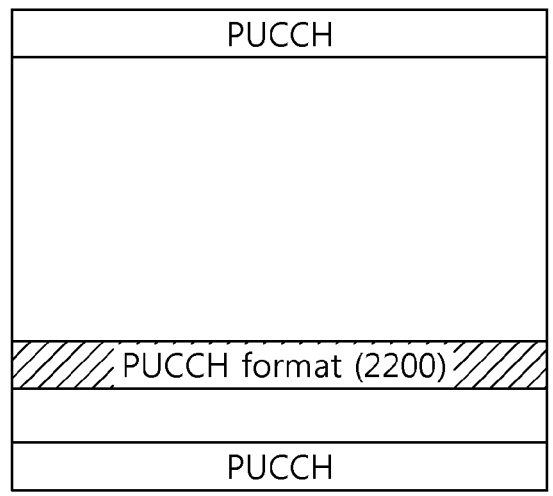
FIG. 22 is a concept view illustrating A/N transmission method through A/N SPS PUSCH according to an embodiment of the present invention.
Figure 22:
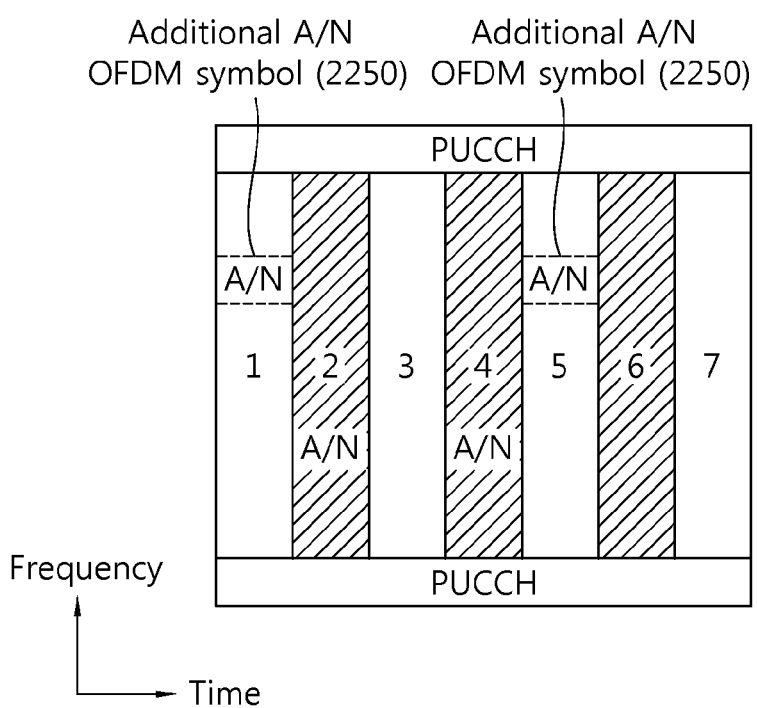

FIG. 22 is a concept view illustrating A/N transmission method through A/N SPS PUSCH according to an embodiment of the present invention.

In FIG. 22A, A/N may be transmitted by using a PUCCH format 2200 for an allocated A/N SPS PUSCH resource. For example, PUCCH format 1a/1b (where an A/N bit for transmission is 1), PUCCH format 2a/2b (where A/N bits for transmission is 2-bits), or PUCCH format 3 (where A/N bits are greater than 2-bits) may be used. When the PUCCH format 3 is used, up to 20 A/N bits can be supported based on A/N bundling.

In FIG. 22B, if A/N is not multiplexed with CSI, A/N may be transmitted by using a PUSCH format of the increasing number of OFDM symbols used for A/N. For example, instead of that a maximum value of the number of OFDM symbols allocated for A/Ns, which is transmitted on PUSCH, is limited to 4 in one subframe, the number of OFDM symbols, in which A/Ns are transmitted, may be increased by using an OFDM symbol 2250 of OFDM symbol 1 and symbol 4 in each slot (in a normal CP) for A/N. In addition to OFDM symbol 2 and 4, symbol 1 and symbol 5 2250 are used for transmitting A/N in each slot, several ways can be considered to use additional OFDM With one method, input to an encoder may be changed. When A/N is encoded, the encoder may perform encoding based on information on whether additional OFDM symbols are used for A/N transmission. The number of A/N resource elements may be determined according to whether to use additional OFDM symbols, and accordingly, encoding may be performed. Encoded A/Ns may be allocated to each resource element through interleaving.

In addition, additional OFDM symbol for A/N transmission may be used only for repetition. That is, in RM code, four OFDM symbols per RB may be considered in generating A/N coded bit. The A/N coded bit may be located in eight symbols per subframe by using interleaving.

In addition, the number of additional OFDM symbols may be limited to be greater than 20-bit A/N bits. The additional OFDM symbols may be used when the number of A/N bits is more than 20 bits. For example, a second set of 20 bits may be encoded to be allocated to OFDM symbol 1 and 5 for each slot. If the number of A/N bits is more than 40 bits, a third set may be defined so that encoded A/Ns are allocated to OFDM symbol 0 and 6 respectively.

In addition, encoding for A/N may be separately performed. Encoding may be performed by using individual code for OFDM symbol 2/4 and 1/5. A/N bits may be equally divided with two codewords. For example, 12 A/N bits may be individually encoded in OFDM symbol 2/4 and OFDM symbol 1/5 by 6-bit before transmission. When individual encoding is performed, the encoding may be performed on the basis of identical coding parameters or different coding parameters for OFDM symbol 2/4 and OFDM symbol 1/5. For example, a lower code rate for OFDM symbol 1/4 may be used as compared to OFDM symbol 2/4, or A/N bits greater than A/N bits in number may be allocated to OFDM symbol 2/4 rather than OFDM symbol 1/5. For example, twelve A/N bits may be divided into seven A/N bits and five A/N bits, and then the divided each bit may be encoded for OFDM symbol 2/4 and 1/5 respectively. If different numbers of A/N bits are allocated to individual coding, information on the difference (or rate) may be delivered to a UE in advance through higher-layer signaling prior to encoding. It is also possible to expand to three sets of OFDM symbols(OFDM symbol 1/5, 2/, 0/6). In this case, three codewords may be generated.

If A/N is transmitted through PUSCH, the number of A/N bits may not be limited. If the number of A/N bits is more than 20 bits, and A/N bundling has been performed, A/N bundling may be repeated.

With another method, it is possible to configure so that a CSI transmission period of a UE is aligned with A/N SPS PUSCH interval and CSI and A/N are multiplexed to be transmitted on PUSCH.

Hereinafter, in an embodiment of the present invention, handling of A/N SPS PUSCH/PUCCH will be described. Even in frequent cell switching, A/N SPS PUSCH/PUCCH data may be delivered to a new cell before deactivation/reactivation of an S-cell is complete so as to continue A/N process. If a scheduled PUSCH subframe exists in a period where cells are switched, the A/N SPS PUSCH/PUCCH may be transmitted to a P-cell, or the A/N SPS PUSCH/PUCCH may be skipped until the S-cell becomes reactivated after the S-cell is switched. If the A/N SPS PUSCH/PUCCH transmission is skipped, data to be transmitted via the A/N SPS PUSCH/PUCCH may be dropped, or delayed until A/N SPS PUSCH/PUCCH is available, after a new S-cell is activated.

If cell switching occurs frequently in the S-cell in order to temporarily permit SPS transmission for the P-cell, the A/N SPS PUSCH/PUCCH may be transmitted through the P-cell rather than the S-cell. A/N of the S-cell may be transmitted over A/N SPS PUSCH for the P-cell. Accordingly, the A/N SPS PUSCH/PUCCH may be scheduled in the P-cell.

In another method, it is possible to use dual A/N. The dual A/N may be transmitted through PUCCH or PUSCH of a P-cell and an S-cell. Such method may be useful in case that the P-cell and the S-cell does not exist at an identical base station site. The P-cell may monitor information on reception of data for the S-cell to transmit to a UE on the basis of the dual A/N. Further, in order to increase UE throughput, its scheduling (data division between the P-cell and the S-cell) is applicable.

The interval of A/N SPS PUSCH/PUCCH may be minimum 10 msec. When the interval of A/N SPS PUSCH/PUCCH is set to 10 msec or more, A/N latency may be increased. Therefore, if the A/N latency is not important, the interval of 10 msec or more may be used. Otherwise, the interval for SPS configuration may be reduced to 2 msec to 5 msec at least.

Figure 23:
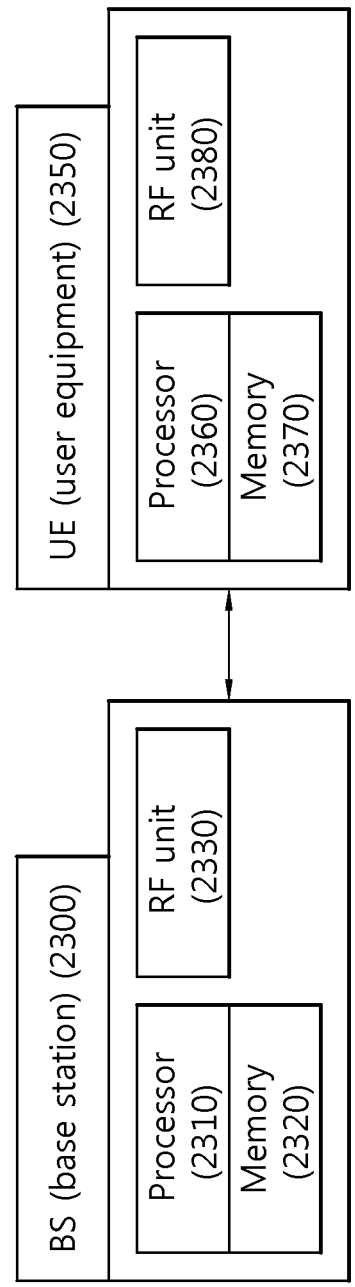
FIG. 23 is a block diagram illustrating a wireless communication system according to an embodiment of the present invention.

FIG. 23 is a block diagram showing a wireless communication system according to an embodiment of the present invention.

Referring to FIG. 23, a BS 2300 includes a processor 2310, a memory 2320 and a RF unit 2330. The memory 2320 is connected to the processor 2310 and configured to store various information used for the operations for the processor 2310. The RF unit 2330 is connected to the processor 2310 and configured to transmit and/or receive a radio signal. The processor 2310 implements the proposed functions, processed, and/or methods. In the described embodiments, the operation of BS may be implemented by the processor 2310.

For example, the processor 2310 may configure A/N SPS PUSCH for UE to transmit a A/N and receive the A/N for downlink transmission via A/N SPS PUSCH.

A wireless apparatus 2350 includes a processor 2360, a memory 2370, and a radio frequency (RF) unit 2380. The memory 2370 is connected to the processor 2360 and configured to store various information used for operating the processor 2360. The RF unit 2380 is connected to the processor 2360 and configured to transmit and/or receive a radio signal. The processor 2360 implements the proposed functions, processed, and/or methods. In the embodiments described above, the operation of the wireless apparatus may be implemented by the processor 2360.

For example, the processor 2360 may configured to be allocated the first ACK/NACK semi-persistent scheduling physical uplink shared channel) A/N SPS PUSCH for the transmission of the first ACK/NACK (A/N) for the downlink transmission of P-cell and be allocated the second A/N SPS PUSCH for the transmission of the second A/N for the downlink transmission of the first S-cell and the third A/N for the downlink transmission of the second S-cell. The processor may configured to transmit the first A/N via the first A/N SPS PUSCH and to transmit the second A/N and the third A/N via the second SPS PUSCH The processor may include application-specific integrated circuits (ASICs), other chipsets, logic circuits, and/or data processors. The memory may include read-only memory (ROM), random access memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. An uplink transmission method, comprising:
    transmitting a first acknowledgement/negative-acknowledgement (ACK/NACK) for downlink transmission of a primary cell (P-cell) to the P-cell through a first uplink ACK/NACK channel by a user equipment (UE); and
    transmitting a second ACK/NACK for downlink transmission of a first secondary cell (S-cell) to the first S-cell through a second uplink ACK/NACK channel by the UE,
    wherein the first uplink ACK/NACK channel is a channel assigned to an uplink frequency bandwidth of the P-cell, wherein the second uplink ACK/NACK channel is a channel assigned to an uplink frequency bandwidth of the first S-cell,
    wherein at least one of the first uplink ACK/NACK channel and the second uplink ACK/NACK channel is an ACK/NACK semi-persistent scheduling (SPS) uplink channel semi-persistently assigned by a base station, wherein the ACK/NACK SPS uplink channel is an ACK/NACK SPS physical uplink shared channel (PUSCH) or an ACK/NACK SPS physical uplink shared channel (PUCCH) assigned to an uplink data region, wherein the P-cell and the first S-cell have been carrier-aggregated, and wherein the first S-cell is activated by the P-cell, wherein the first S-cell is set to a target cell and an uplink cell, wherein the target cell is a cell that transmits an aggregation ACK/NACK signal obtained by aggregating an ACK/NACK signal for downlink transmission to an uplink channel of the uplink cell, and wherein the uplink cell is a cell that transmits the aggregation ACK/NACK signal.

2. The method of claim 1, further comprising:
when the first uplink ACK/NACK channel is the ACK/NACK SPS uplink channel, receiving resource allocation information of the first uplink ACK/NACK channel for transmitting the first ACK/NACK from the base station by the UE.

3. The method of claim 2, further comprising:
when the second uplink ACK/NACK channel is the ACK/NACK SPS uplink channel, receiving resource allocation information of the second uplink ACK/NACK channel for transmitting the second ACK/NACK from the base station by the UE.

4. The method of claim 3, further comprising:
receiving resource allocation information of the second uplink ACK/NACK channel for transmitting a third ACK/NACK for downlink transmission of a second S-cell from the base station by the UE; and
transmitting the third ACK/NACK to the first S-cell through the second uplink ACK/NACK channel by the UE, wherein the second S-cell has been carrier-aggregated with the P-cell and the first S-cell, and wherein the second S-cell is activated by the P-cell.

5. The method of claim 4, wherein the second S-Cell is also set to the target cell.

6. The method of claim 4,
wherein the first uplink ACK/NACK channel is a channel assigned to an nth uplink sub-frame (n is a natural number) of the P-cell,
wherein the first ACK/NACK is an ACK/NACK for an n-kth downlink sub-frame of the P-cell
wherein the k is a natural number more than 4 and is equal to or smaller than a transmission interval+4−1 of the first uplink ACK/NACK channel, and
wherein the transmission interval of the first uplink ACK/NACK channel is information regarding an interval on a time axis where the first uplink ACK/NACK channel is assigned.

7. The method of claim 4,
wherein the second uplink ACK/NACK channel is a channel assigned to an nth uplink sub-frame (n is a natural number) of the first S-cell,
wherein the second ACK/NACK is an ACK/NACK for an n-kth downlink sub-frame of the first S-cell,
wherein the third ACK/NACK is an ACK/NACK for an n-kth downlink sub-frame of the second S-cell,
wherein the k is a natural number more than 4 and is equal to or smaller than a transmission interval+4−1 of the second uplink ACK/NACK channel), and
wherein the transmission interval of the second uplink ACK/NACK channel is information regarding an interval on a time axis where the second uplink ACK/NACK channel is assigned.

8. A user equipment (UE) conducting uplink transmission in a wireless communication system, the UE comprising a processor,
wherein the processor is implemented to:
transmit a first acknowledgement/negative-acknowledgement (ACK/NACK) for downlink transmission of a primary cell (P-cell) to the P-cell through a first uplink ACK/NACK channel; and
transmit a second ACK/NACK for downlink transmission of a first secondary cell (S-cell) to the first S-cell through a second uplink ACK/NACK channel,
wherein the first uplink ACK/NACK channel is a channel assigned to an uplink frequency bandwidth of the P-cell,
wherein the second uplink ACK/NACK channel is a channel assigned to an uplink frequency bandwidth of the first S-cell,
wherein at least one of the first uplink ACK/NACK channel and the second uplink ACK/NACK channel is an ACK/NACK SPS (semi-persistent scheduling) uplink channel semi-persistently assigned by a base station,
wherein the ACK/NACK SPS uplink channel is an ACK/NACK SPS PUSCH (physical uplink shared channel) or an ACK/NACK SPS PUCCH (physical uplink shared channel) assigned to an uplink data region,
wherein the P-cell and the first S-cell have been carrier-aggregated, and wherein the first S-cell is activated by the P-cell,
wherein the first S-cell is set to a target cell and an uplink cell,
wherein the target cell is a cell that transmits an aggregation ACK/NACK signal obtained by aggregating an ACK/NACK signal for downlink transmission to an uplink channel of the uplink cell, and
wherein the uplink cell is a cell that transmits the aggregation ACK/NACK signal.

9. The UE of claim 8,
wherein, when the first uplink ACK/NACK channel is the ACK/NACK SPS uplink channel, the processor is implemented to receive resource allocation information of the first uplink ACK/NACK channel for transmitting the first ACK/NACK from the base station.

10. The UE of claim 9,
wherein, when the second uplink ACK/NACK channel is the ACK/NACK SPS uplink channel, the processor is implemented to receive resource allocation information of the second uplink ACK/NACK channel for transmitting the second ACK/NACK from the base station.

11. The UE of claim 10,
wherein the processor is implemented to receive resource allocation information of the second uplink ACK/NACK channel for transmitting a third ACK/NACK for downlink transmission of a second S-cell from the base station; and
transmit the third ACK/NACK to the first S-cell through the second uplink ACK/NACK channel, wherein the second S-cell has been carrier-aggregated with the P-cell and the first S-cell, and wherein the second S-cell is activated by the P-cell.

12. The UE of claim 11, wherein the second S-Cell is also set to the target cell.

13. The UE of claim 11,
wherein the first uplink ACK/NACK channel is a channel assigned to an nth uplink sub-frame (n is a natural number) of the P-cell, wherein the first ACK/NACK is an ACK/NACK for an n-kth downlink sub-frame of the P-cell, wherein the k is a natural number more than 4 and is equal to or smaller than a transmission interval+4−1 of the first uplink ACK/NACK channel), and wherein the transmission interval of the first uplink ACK/NACK channel is information regarding an interval on a time axis where the first uplink ACK/NACK channel is assigned.

14. The UE of claim 11, wherein the second uplink ACK/NACK channel is a channel assigned to an nth uplink sub-frame (n is a natural number) of the first S-cell, wherein the second ACK/NACK is an ACK/NACK for an n-kth downlink sub-frame of the first S-cell, wherein the third ACK/NACK is an ACK/NACK for an n-kth downlink sub-frame of the second S-cell, wherein the k is a natural number more than 4 and is equal to or smaller than a transmission interval+4−1 of the second uplink ACK/NACK channel, and wherein the transmission interval of the second uplink ACK/NACK channel is information regarding an interval on a time axis where the second uplink ACK/NACK channel is assigned.

* * * * *